US011373324B2

(12) United States Patent
Azuma et al.

(10) Patent No.: US 11,373,324 B2
(45) Date of Patent: Jun. 28, 2022

(54) DEPTH ACQUISITION DEVICE AND DEPTH ACQUISITION METHOD FOR PROVIDING A CORRECTED DEPTH IMAGE

(71) Applicant: Panasonic Intellectual Property Management Co., Ltd., Osaka (JP)

(72) Inventors: Takeo Azuma, Kyoto (JP); Satoshi Sato, Kyoto (JP); Nobuhiko Wakai, Tokyo (JP); Kohsuke Yoshioka, Osaka (JP); Noritaka Shimizu, Osaka (JP); Yoshinao Kawai, Kyoto (JP); Takaaki Amada, Kyoto (JP); Yoko Kawai, Osaka (JP); Takeshi Murai, Kyoto (JP); Hiroki Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/152,231

(22) Filed: Jan. 19, 2021

(65) Prior Publication Data
US 2021/0142500 A1 May 13, 2021

Related U.S. Application Data

(63) Continuation of application No. PCT/JP2019/028321, filed on Jul. 18, 2019.

(30) Foreign Application Priority Data

Sep. 27, 2018 (JP) .............................. JP2018-182364

(51) Int. Cl.
*G06T 7/586* (2017.01)
*G06T 7/536* (2017.01)
*G06T 7/593* (2017.01)

(52) U.S. Cl.
CPC .............. *G06T 7/586* (2017.01); *G06T 7/536* (2017.01); *G06T 7/596* (2017.01)

(58) Field of Classification Search
None
See application file for complete search history.

(56) References Cited

U.S. PATENT DOCUMENTS

2012/0177252 A1 7/2012 Korekado et al.
2016/0231807 A1* 8/2016 Ogasawara ........ H04N 5/23293
(Continued)

FOREIGN PATENT DOCUMENTS

JP 2011-64498 3/2011
JP 2016-148899 8/2016
(Continued)

OTHER PUBLICATIONS

International Search Report dated Sep. 17, 2019 in International (PCT) Application No. PCT/JP2019/028321.
(Continued)

*Primary Examiner* — Tahmina N Ansari
(74) *Attorney, Agent, or Firm* — Wenderoth, Lind & Ponack, L.L.P.

(57) ABSTRACT

A depth acquisition device includes a memory and a processor performing: acquiring, from the memory, intensities of infrared light measured by imaging with infrared light emitted from a light source and reflected on a subject by pixels in an imaging element; generating a depth image by calculating the distance for each pixel based on the intensities; acquiring, from the memory, a visible light image generated by imaging, with visible light, the substantially same scene from the substantially same viewpoint at the substantially same timing as those of the infrared light image; detecting a lower reflection region showing an object having a lower reflectivity from the infrared light image in
(Continued)

accordance with the infrared light image and the visible light image; correcting a corresponding lower reflection region in the depth image in accordance with the visible light image; and outputting the depth image with the corrected lower reflection region.

9 Claims, 14 Drawing Sheets

(56) References Cited

U.S. PATENT DOCUMENTS

| | | |
|---|---|---|
| 2017/0347086 A1 | 11/2017 | Watanabe |
| 2018/0011194 A1 | 1/2018 | Masuda et al. |
| 2018/0135980 A1 | 5/2018 | Nakamura et al. |
| 2019/0197330 A1* | 6/2019 | Mahmoud ............ A61B 5/6898 |
| 2021/0142500 A1* | 5/2021 | Azuma .................. G06T 7/596 |
| 2021/0144314 A1* | 5/2021 | Azuma ................. H04N 5/332 |

FOREIGN PATENT DOCUMENTS

| | | |
|---|---|---|
| JP | 2017-49662 | 3/2017 |
| JP | 2017-216678 | 12/2017 |
| KR | 10-2017-0107269 | 9/2017 |
| WO | 2016/151918 | 9/2016 |
| WO | 2017/013857 | 1/2017 |

OTHER PUBLICATIONS

Extended European Search Report dated Oct. 29, 2021 in corresponding European Patent Application No. 19867598.5.

* cited by examiner

FIG. 2

| 21 | IR | IR | IR | IR | ... | 2 |
|----|----|----|----|----|----|----|
| 22 | BW | BW | BW | BW | ... |  |
|    | IR | IR | IR | IR | ... |  |
|    | BW | BW | BW | BW | ... |  |
|    | ⋮  | ⋮  | ⋮  | ⋮  |    |  |

DEPTH ACQUISITION DEVICE AND DEPTH ACQUISITION METHOD FOR PROVIDING A CORRECTED DEPTH IMAGE

CROSS REFERENCE TO RELATED APPLICATIONS

This application is a U.S. continuation application of PCT International Patent Application Number PCT/JP2019/028321 filed on Jul. 18, 2019, claiming the benefit of priority of Japanese Patent Application Number 2018-182364 filed on Sep. 27, 2018, the entire contents of which are hereby incorporated by reference.

BACKGROUND

1. Technical Field

The present disclosure relates to depth acquisition devices and the like which acquire a distance to a subject of an image as a depth.

2. Description of the Related Art

Conventionally, a distance measurer for measuring a distance to a subject of image has been proposed (for example, refer to Japanese Unexamined Patent Application Publication No. 2011-64498 (PTL 1)). This distance measurer includes a light source and an imager. The light source irradiates the subject with light. The imager images the light reflected on the subject. Then, the distance measurer converts each pixel value in the image generated by the imaging into a distance to the subject, thereby measuring the distance to the subject. In other words, the distance measurer acquires a depth of the image generated by the imager.

SUMMARY

However, the distance measurer in NPL 1 has a problem of failing to accurately acquire the depth.

Therefore, the present disclosure provides a depth acquisition device capable of accurately acquiring a depth which is a distance from the depth acquisition device to a subject of image.

In accordance with an aspect of the present disclosure, a depth acquisition device includes: a memory; and a processor, wherein the processor performs: acquiring intensities of infrared light which are stored in the memory the intensities being measured by imaging performed by receiving the infrared light reflected on a subject by respective pixels in an imaging element, the infrared light having been emitted from a light source; generating a depth image, by calculating a distance to the subject as a depth for each of the respective pixels in the imaging element, based on an intensity received by the pixel among the intensities of the infrared light; acquiring a visible light image stored in the memory, the visible light image being generated by imaging a substantially same scene as a scene of an infrared light image, with visible light from a substantially same viewpoint as a viewpoint of imaging the infrared light image at a substantially same timing as a timing of imaging the infrared light image, the infrared light image being generated by the imaging based on the intensities of the infrared light received by the respective pixels in the imaging element; detecting a lower reflection region showing an object in the infrared light image in accordance with the infrared light image and the visible light image, the object having a lower reflectivity to the infrared light among the subject; correcting a lower reflection region in the depth image in accordance with the visible light image, the lower reflection region in the depth image corresponding to the lower reflection region in the infrared light image; and outputting the depth image with the lower reflection region corrected.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

The depth acquisition device according to the preset disclosure is capable of accurately acquiring a depth which is a distance to a subject of image. Additional advantages and effects of the aspect of the present disclosure will be apparent from the Description and the Drawings. The advantages and/or effects may be individually obtained by the various embodiments and the features of the Description and the Drawings, which need to all be provided in order to obtain one or more such advantages and/or effects.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a schematic diagram illustrating a pixel array in a solid-state imaging element according to Embodiment;

Figure 1:
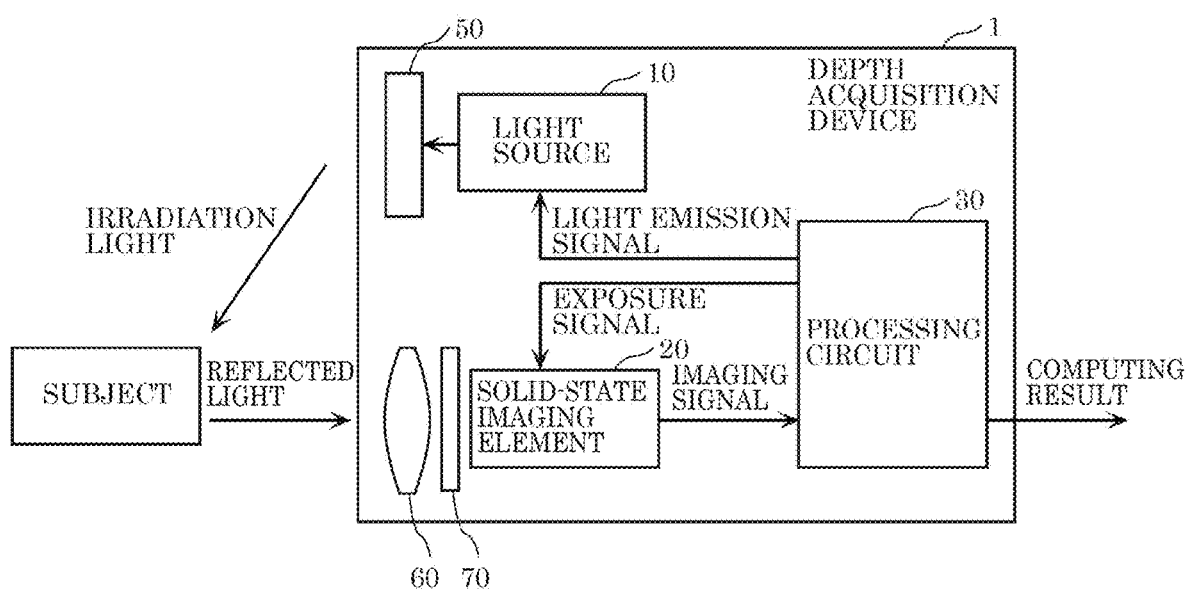
FIG. 1 is a block diagram illustrating a hardware structure of a depth acquisition device according to Embodiment.

DETAILED DESCRIPTION OF THE EMBODIMENT (Findings on which the Present Disclosure is Based)

The present inventors have found that the following problems occur in connection with the distance measurer of PTL 1 described in the "BACKGROUND ART" section.

The distance measurer of PTL 1, as described above, acquires an image by irradiating light from a light source to a subject and imaging the subject irradiated with light, and measures depth of the image. In the measurement of depth, Time of Flight (ToF) is used. In such a distance measurer, imaging at mutually different imaging conditions is performed to improve distance measurement accuracy. That is, the distance measurer performs imaging according to a predetermined imaging condition, and depending on that imaging result, sets an imaging condition different from the predetermined imaging condition. Then, the distance measurer performs imaging again according to the set imaging condition.

However, with the distance measurer of PTL 1 described above, even if imaging condition is changed, it is difficult to properly measure a depth which is a distance to a subject having lower reflectivity to irradiation light.

In order to solve the above problem, a depth acquisition device in accordance with an aspect of the present disclosure includes: a memory; and a processor, wherein the processor performs: acquiring intensities of infrared light which are stored in the memory, the intensities being measured by imaging performed by receiving the infrared light reflected on a subject by respective pixels in an imaging element, the infrared light having been emitted from a light source; generating a depth image, by calculating a distance to the subject as a depth for each of the respective pixels in the imaging element, based on an intensity received by the pixel among the intensities of the infrared light; acquiring a visible light image stored in the memory, the visible light image being generated by imaging a substantially same scene as a scene of an infrared light image, with visible light from a substantially same viewpoint as a viewpoint of imaging the infrared light image at a substantially same timing as a timing of imaging the infrared light image, the infrared light image being generated by the imaging based on the intensities of the infrared light received by the respective pixels in the imaging element; detecting a lower reflection region showing an object in the infrared light image in accordance with the infrared light image and the visible light image, the object having a lower reflectivity to the infrared light among the subject; correcting a lower reflection region in the depth image in accordance with the visible light image, the lower reflection region in the depth image corresponding to the lower reflection region in the infrared light image; and outputting the depth image with the lower reflection region corrected. It should be noted that the lower reflection region of the depth image refers to a region in the depth image, which is located at the same position as that of the lower reflection region in the infrared light image, and which has the same shape and size as those of the lower reflection region. Hereinafter, such a lower reflection region of the depth image is also referred to as a correction target region.

For example, if the subject contains an object with a lower reflectivity to infrared light (hereinafter, also referred to as a lower reflection object), the distance to a lower reflection object, that is, the depth, which is calculated based on the intensity of the infrared light reflected by the lower reflection object, is likely to be calculated to be longer than the actual depth. That is, the correct depth is not shown in the region of the depth image corresponding to the lower reflection object.

However, in the depth acquisition device according to the above-described one aspect, a lower reflection region, which is a region in which the lower reflection object is shown, is detected in the infrared light image, and a region in the depth image corresponding to the lower reflection region is designated as the correction target region. That is, a region in which an inappropriate depth is shown in the depth image because a lower reflection object is included in the subject is identified as the correction target region. Then, by correcting the depth of the correction target region, it is possible to accurately acquire the depth which is the distance to the lower reflection object.

Here, one example of images of a substantially same scene, which are imaged at a substantially same viewpoint and time, are images which are imaged by different pixels of the same imaging element. These images are similar to each channel image of red, green, and blue of a color image, which is imaged with a color filter of Bayer array in which the viewing angle, the viewpoint point, and the imaging time of each image are substantially equal. That is, images of a substantially same scene, which are imaged at a substantially same viewpoint and time, will not differ in the position on the image of a subject by not less than two pixels in each of imaged images. For example, when a point light source having visible light and infrared light components is present in a scene, and only one pixel is imaged to have higher luminance in the visible light image, the point light source is imaged in the infrared light image as well within a distance closer than two pixels from the pixel corresponding to the position of the pixel imaged in the visible light image. Moreover, imaging at substantially same time indicates that the imaging time is equal within a difference of not more than one frame.

It is possible that the detecting of the lower reflection region includes: detecting a region showing an object in the visible light image as an object region; determining whether or not an illuminance of a determination target region corresponding to the object region in the infrared light image is not greater than a first threshold; and detecting, as the lower reflection region, the determination target region having the illuminance determined as not being greater than the first threshold. For example, the object region is detected by processing such as pattern matching or image recognition. It should be noted that a region in the infrared light image corresponding to the object region is a region in the infrared light image, which is located at the same position as that of the object region in the visible light image, and which has the same shape and size as those of the object region.

As a result of this, from the visible light image, the region in which the object is shown is detected as the object region. It is likely that the object shown in the object region detected in this way is located not in the distant background but in the vicinity, and the object is irradiated with infrared light from the light source. Then, if the luminance in the region in the infrared light image corresponding to the object region is low, it is likely that the object is a lower reflection object. Therefore, in the depth acquisition device according to the above-described one aspect, a region in the infrared light image corresponding to the object region and having a luminance not more than the first threshold is detected as a lower reflection region so that it is possible to appropriately detect the lower reflection region.

It is also possible that the detecting of the lower reflection region further includes: determining whether or not a noise intensity in the determination target region is not greater than a second threshold, the noise intensity being among the intensities of the infrared light which are acquired from the memory; and detecting, as the lower reflection region, the determination target region having the noise intensity determined as not being greater than the second threshold.

For example, the subject may be irradiated not only with infrared light from a light source but also with infrared light contained in external light such as sunlight. Accordingly, the intensity of infrared light contained in the external light is treated as noise intensity, and an infrared light image may be formed based on the intensity of infrared light excluding the noise intensity. However, if the noise intensity is large, such as in bright daytime, the luminance of the infrared light image becomes lower since the noise intensity is removed. Therefore, if the noise intensity is large, even if the luminance of the region in the infrared light image corresponding to the object region of the visible light image is low as described above, there is possibility that the region is not the lower reflection region. Therefore, in the depth acquisition device according to the above-described one aspect, since a region having small noise intensity which is determined to be not more than the second threshold is detected as a lower reflection region, it is possible to appropriately detect the lower reflection region.

It is further possible that the intensities of the infrared light which are acquired from the memory include three or more intensities for each of the respective pixels in the imaging element, the three or more intensities being measured by exposure of the imaging element at three or more different timings when each of the respective pixels in the imaging element receives the infrared light reflected on the subject after the light source emits the light, and in the generating of the depth image, the depth image is generated by calculating a depth for each of the respective pixels in the imaging element in accordance with the three or more intensities measured for the pixel.

This makes it possible to generate a depth image at high accuracy by using ToF.

It is still further possible that the noise intensity is a lowest intensity among the three or more intensities.

This makes it possible to appropriately acquire noise intensity.

It is still further possible that the correcting of the lower reflection region in the depth image includes: identifying a type of the object shown in a region corresponding to the lower reflection region in the visible light image, in accordance with image of the region in the visible light image; and correcting a depth of the lower reflection region in the depth image, by estimating a depth of the region in the visible light image based on the identified type of the object and a size of the object shown in the region. For example, the type of the object is identified by processing such as pattern matching or image recognition. It should be noted that a region in the visible light image corresponding to the lower reflection region is a region in the visible light image which is located at the same position as that of the lower reflection region in the infrared light image, and which has the same shape and size as those of the lower reflection region.

This makes it possible to appropriately estimate a depth based on the type and size of the object, which is identified based on the image of a region in the visible light image corresponding to the lower reflection region, provided correspondence between the type and size of an object, and the depth thereof is known. Consequently, it is possible to correct the depth of the lower reflection region of the depth image, that is, the correction target region, to an accurate depth.

Further, the depth of the correction target region may be corrected to the depth of a region below the correction target region without using the visible light image.

For example, when the above-described lower reflection object is a vehicle, the foot of the vehicle is a road surface, and the depth of the road surface is close to the depth of the vehicle. Therefore, in the depth acquisition device according to the above-described one aspect, since the depth of the correction target region is corrected to the depth of the region below the correction target region, it is possible to correct the depth of the correction target region to an accurate depth.

In accordance with another aspect of the present disclosure, a depth acquisition device includes: a memory; and a processor, wherein the processor performs: acquiring intensities of infrared light which are stored in the memory, the intensities being measured by imaging performed by receiving the infrared light reflected on a subject by respective pixels in an imaging element, the infrared light having been emitted from a light source; generating a depth image, by calculating a distance to the subject as a depth for each of the respective pixels in the imaging element, based on an intensity received by the pixel among the intensities of the infrared light; acquiring a visible light image stored in the memory, the visible light image being generated by imaging a substantially same scene as a scene of an infrared light image, with visible light from a substantially same viewpoint as a viewpoint of imaging the infrared light image at a substantially same timing as a timing of imaging the infrared light image, the infrared light image being generated by the imaging based on the intensities of the infrared light received by the respective pixels in the imaging element; correcting a depth of the depth image by inputting the depth image, the infrared light image, and the visible light image into a learning model and outputting the depth image with the depth corrected.

If a learning model is trained in advance so as to output a correct depth image after correction upon input of a depth image, an infrared light image, and a visible light image, it is possible to acquire an appropriate depth image without detecting a lower reflection region.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

Hereinafter, an embodiment will be described in detail with reference to the accompanying Drawings.

It should be noted that the following embodiment is a general or specific example of the present disclosure. The numerical values, shapes, materials, elements, arrangement and connection configuration of the elements, steps, the order of the steps, etc., described in the following embodiment are merely examples, and are not intended to limit the present disclosure.

It should also be noted that the respective figures are schematic diagrams and are not necessarily precise illustrations. Additionally, components that are essentially the same share like reference signs in the figures.

Embodiment

[Hardware Configuration]

FIG. 1 is a block diagram illustrating a hardware configuration of depth acquisition device 1 according to Embodiment. Depth acquisition device 1 according to the present embodiment has a hardware configuration which is capable of acquiring an image based on infrared light (or near infrared light) and an image based on visible light by imaging of a substantially same scene, the imaging being performed at a substantially same viewpoint and imaging time. It should be noted that substantially same means "the same to the extent that the effects in the present disclosure can be achieved."

As shown in FIG. 1, depth acquisition device 1 is configured to include light source 10, solid-state imaging element 20, processing circuit 30, diffusion plate 50, lens 60, and band-pass filter 70.

Light source 10 irradiates irradiation light. More specifically light source 10 emits irradiation light to be irradiated to a subject at a timing indicated by a light emission signal generated in processing circuit 30.

Light source 10 is configured to include, for example, a capacitor, a driving circuit, and a light emitting element, and emits light by driving the light emitting element with electric energy accumulated in the capacitor. The light emitting element is implemented by as an example, a laser diode, a light emitting diode, and the like. It should be noted that light source 10 may be configured to include one kind of light emitting element, or configured to include plural kinds of light emitting elements according to purposes.

Hereinafter, the light emitting element is, for example, a laser diode that emits near infrared light, or a light emitting diode that emits near infrared light, or the like. However, the irradiation light irradiated by light source 10 may be infrared light (also referred to as infrared ray) of a frequency band other than near infrared light. Hereinafter, in the present embodiment, although the irradiation light irradiated by light source 10 will be described as infrared light, the infrared light may be near infrared light, or infrared light of a frequency band other than that of near infrared light.

Solid-state imaging element 20 images a subject and outputs an imaging signal indicating an exposure amount. To be more specifically, solid-state imaging element 20 performs exposure at a timing indicated by an exposure signal generated in processing circuit 30, and outputs an imaging signal indicating an exposure amount.

Solid-state imaging element 20 has a pixel array in which a first pixel that performs imaging with reflected light, which is irradiation light reflected by a subject, and a second pixel that images the subject are disposed in an array. Solid-state imaging element 20 may have, for example, as needed, cover glass, and a logic function such as an A/D converter, etc.

Hereinafter, as with the irradiation light, description will be made supposing that the reflected light is infrared light. However, the reflected light does not need to be limited to infrared light provided that the light is irradiation light reflected by a subject.

Figure 2:
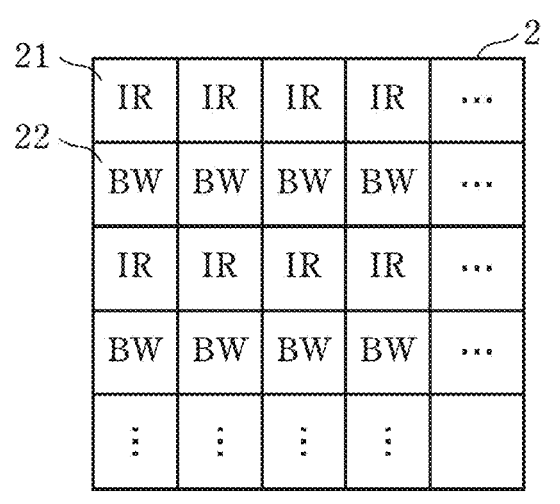

FIG. 2 is a schematic diagram illustrating pixel array 2 included in solid-state imaging element 20.

As shown in FIG. 2, pixel array 2 is configured to be disposed in an array pattern such that first pixel 21 (IR pixel) that performs imaging with reflected light, which is irradiation light reflected by a subject, and second pixel 22 (BW pixel) that images the subject are alternately aligned in columns.

Moreover, in FIG. 2, although second pixel 22 and first pixel 21 are arranged to be adjacent to each other in the row direction and are disposed to be aligned in a stripe pattern in the row direction, in pixel array 2, this is not limiting and they may be disposed every multiple rows (every two rows, for example). That is, the first row in which second pixels 22 are arranged to be adjacent to each other in the row direction, and the second row in which first pixels 21 are arranged to be adjacent to each other in the row direction may be disposed alternately every M rows (M is a natural number). Further, the first row, in which second pixels 22 are arranged to be adjacent to each other in the row direction, and the second row, in which first pixels 21 are arranged to be adjacent to each other in the row direction, may be disposed every different number of rows (N rows of the first row and L rows of the second row are alternately repeated (N and L are different natural numbers)).

First pixel 21 is implemented by, for example, an infrared light pixel sensitive to infrared light which is the reflected light. Second pixel 22 is implemented by, for example, a visible light pixel sensitive to visible light.

The infrared light pixel is configured to include, for example, an optical filter (also called as an IR filter) which transmits only infrared light, a micro lens, a light receiving element as a photoelectric converter, and an accumulator that accumulates electric charge generated at the light receiving element. Therefore, an image indicating the luminance of infrared light is represented by an imaging signal outputted from a plurality of infrared light pixels (that is, first pixel 21) included in pixel array 2. Hereinafter, this image of infrared light is also referred to as IR image or infrared image.

Moreover, the visible light element is configured to include, for example, an optical filter (also called as a BW filter) which transmits only visible light, a micro lens, a light receiving element as a photoelectric converter, and an accumulator that accumulates electric charge converted at the light receiving element. Therefore, the visible light pixel, that is, second pixel 22, outputs an imaging signal indicating luminance and color difference. That is, a color image that indicates luminance and color difference of visible light is represented by an imaging signal outputted from a plurality of second pixels 22 included in pixel array 2. It should be noted that the optical filter of visible light pixel may transmit both visible light and infrared light, or may transmit only light of a specific wavelength such as red (R), green (G), or blue (B) of visible light.

Moreover, the visible light pixel may detect only the luminance of visible light. In this case, the visible light pixel, that is, second pixel 22, outputs an imaging signal indicating luminance. Therefore, a pixel of black and white that indicates the luminance of visible light, in other words, a monochrome image is represented by an imaging signal outputted from a plurality of second pixels 22 included in pixel array 2. This monochrome image is hereinafter referred to as a BW image. It should be noted that the above-described color image and the BW image are collectively referred to as a visible light image.

Referring back to FIG. 1 again, description of depth acquisition device 1 will be continued.

Processing circuit 30 computes subject information relating to a subject by using the imaging signal outputted by solid-state imaging element 20.

Processing circuit 30 is constituted by, for example, an arithmetic processing unit such as a microcomputer. The microcomputer includes a processor (microprocessor), a memory, etc. and generates a light emitting signal and an exposure signal by the processor executing a driving program stored in the memory. It should be noted that processing circuit 30 may use PGA or ISP, etc. and may be constituted by one hardware or multiple hardware.

Processing circuit 30 calculates distance to a subject by for example, a TOF distance measurement method which is performed by using the imaging signal from first pixel 21 of solid-state imaging element 20.

Hereinafter, referring to the drawings, calculation of distance to a subject by the TOF distance measurement method performed by processing circuit 30 will be described.

Figure 3:
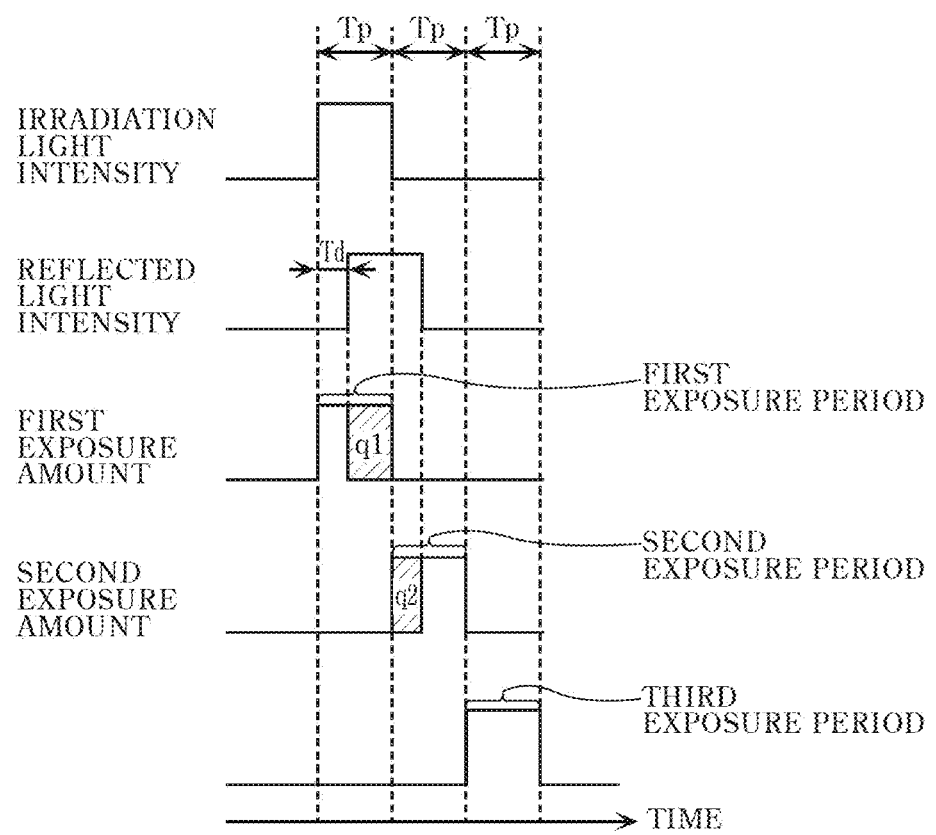
FIG. 3 is a time chart illustrating a light emitting timing of a light emitting element of a light source and exposure timings of a first pixel in the solid-stage imaging element according to Embodiment.

FIG. 3 is a time chart illustrating a relationship between the light emitting timing of the light emitting element of light source 10 and the exposure timing of first pixel 21 of solid-state imaging element 20 when processing circuit 30 calculates a distance to a subject by using the TOF distance measurement method.

In FIG. 3, Tp is a light emission period during which a light emitting element of light source 10 emits irradiation light, and Td is a delay time from when the light emitting element of light source 10 emits the irradiation light until when reflected light which is the irradiation light reflected by a subject returns to solid-state imaging element 20. And the first exposure period is at the same timing at that of the light emission period during which light source emits irradiation light, and the second exposure period is timing from the end time point of the first exposure period until an elapse of the light emission period Tp.

In FIG. 3, q1 indicates a total amount of exposure amount in first pixel 21 of solid-state imaging element 20 by the reflected light in the first exposure period, and q2 indicates a total amount of exposure amount in first pixel 21 of solid-state imaging element 20 by the reflected light in the second exposure period.

By performing light emission of irradiation light by the light emitting element of light source 10 and exposure by first pixel 21 of solid-state imaging element 20 at a timing shown in FIG. 3, it is possible to represent a distance d to a subject by the following (Equation 1) with c as the speed of light.

$$d = c \times Tp/2 \times q2/(q1+q2) \quad \text{(Equation 1)}$$

Therefore, processing circuit 30 can calculate the distance to a subject by using an imaging signal from first pixel 21 of solid-state imaging element 20 by using (Equation 1).

Further, a plurality of first pixels 21 of solid-state imaging element 20 may be exposed for a third exposure period Tp after the end of the first exposure period and the second exposure period. The plurality of first pixels 21 can detect noises other than reflected light by the exposure amount obtained in the third exposure period Tp. That is, processing circuit 30 can more accurately calculate the distance d to a subject by deleting noises respectively from exposure amount q1 in the first exposure period and exposure amount q2 in the second exposure period, in the above-described (Equation 1).

Referring back to FIG. 1 again, description of depth acquisition device 1 will be continued.

Processing circuit 30 may perform detection of a subject, and calculation of the distance to the subject by using imaging signals from, for example, second pixel 22 of solid-state imaging element 20.

That is, processing circuit 30 may perform detection of a subject and calculation of a distance to the subject based on visible light image imaged by a plurality of second pixels 22 of solid-state imaging element 20. Here, the detection of a subject may be implemented by, for example, performing discrimination of shape by pattern recognition through edge detection of a singular point of the subject, or may be implemented by processing such as Deep Learning by using a learning model trained in advance. Further, calculation of a distance to the subject may be performed by using global coordinate transformation. As a matter of course, detection of a subject may be implemented by multi-modal learning process by using not only visible light image, but also luminance and distance information of infrared light imaged by first pixel 21.

Processing circuit 30 generates a light emission signal indicating the timing of light emission, and an exposure signal indicating the timing of exposure. Then, processing circuit 30 outputs the generated light emission signal to light source 10, and outputs the generated exposure signal to solid-state imaging element 20.

Processing circuit 30 may make depth acquisition device 1 implement continuous imaging at a predetermined frame rate, for example, by generating and outputting a light emission signal so as to make light source 10 emit light on a predetermined cycle, and generating and outputting an exposure signal so as to expose solid-state imaging element 20 on a predetermined cycle. Moreover, processing circuit 30 includes, for example, a processor (microprocessor), a memory, and the like, and a light emission signal and an exposure signal are generated by the processor executing driving program stored in the memory.

Diffusion plate 50 adjusts the intensity distribution and the angle of irradiation light. Moreover, in the adjustment of the intensity distribution, diffusion plate 50 makes the intensity distribution of irradiation light from light source 10 uniform. It should be noted that in the example shown in FIG. 1, depth acquisition device 1 includes diffusion plate 50; however, this diffusion plate 50 may not be included.

Lens 60 is an optical lens that collects light entering from the outside of depth acquisition device 1 on the surface of pixel array 2 of solid-state imaging element 20.

Band-pass filter 70 is an optical filter that transmits infrared light which is reflected light and visible light. It should be noted that in an example shown in FIG. 1, depth acquisition device 1 includes band-pass filter 70; however, this band-pass filter 70 may not be included.

Depth acquisition device 1 of the above-described configuration is used by being installed on a transport equipment. For example, depth acquisition device 1 is used by being installed on a vehicle that travels on the road surface. It should be noted that the transport equipment on which depth acquisition device 1 is installed does not need to be limited to a vehicle. Depth acquisition device 1 may be used by being installed on a transport equipment other than vehicles, such as motorcycles, boats, air planes, and the like.

[Function Structure of Depth Acquisition Device]

Depth acquisition device 1 according to the present embodiment acquires an IR image and a BW image by imaging a substantially same scene, at a substantially same viewpoint and time with the hardware structure shown in FIG. 1. Here, the IR image is formed based on the intensity of infrared light received by each of a plurality of first pixels 21 included in solid-state imaging element 20. Therefore, depth acquisition device 1 acquires the intensity of infrared light in each of the plurality of first pixels 21 by the imaging of an IR image. Depth acquisition device 1 acquires a depth image which indicates the distance to a subject being shown in the IR image as a depth based on the intensity of the infrared light of first pixels 21. Then, depth acquisition device 1 detects a lower reflection region in the IR image based on the IR image and the BW image, and corrects the depth of the region in the depth image corresponding to the lower reflection region. It should be noted that in the present disclosure, a second region in a second image corresponding to the first region in the first image is a region in the second image, which is located at the same position as that of the first region in the first image, and has the same shape and size as those of the first region. The first image and the second image are arbitrary images, respectively, and the first region and the second region are also arbitrary regions, respectively.

Figure 4:
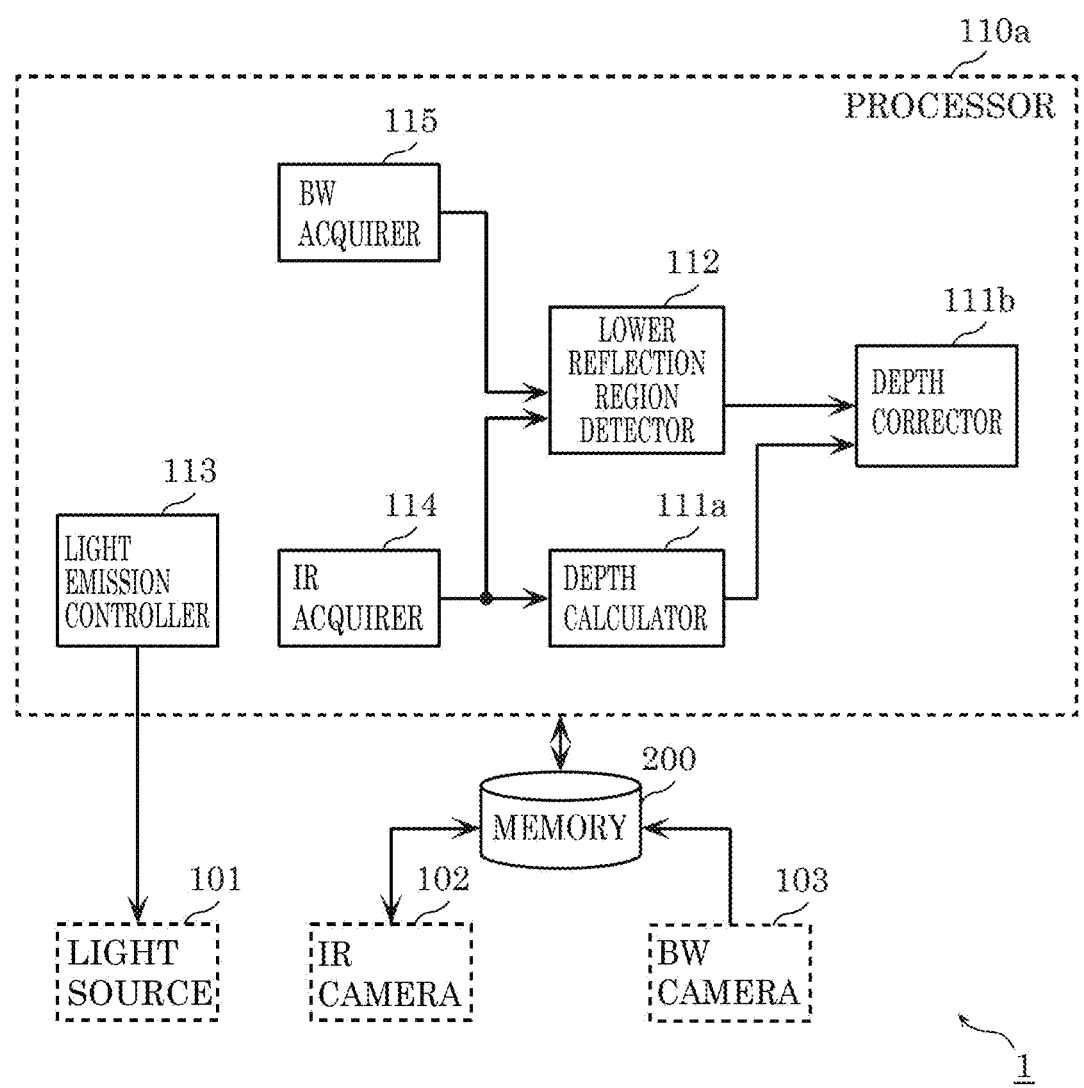
FIG. 4 is a block diagram illustrating an example of a functional structure of the depth acquisition device according to Embodiment.

FIG. 4 is a block diagram illustrating an example of a functional structure of depth acquisition device 1.

Depth acquisition device 1 includes light source 101, IR camera 102, BW camera 103, processor 110a, and memory 200. It should be noted that although depth acquisition device 1 according to the present embodiment includes light source 101, IR camera 102, and BW camera 103, it may not include these components and may include only processor 110a and memory 200.

Light source 101, which may be constituted by light source 10 and diffusion plate 50 as shown in FIG. 1, emits light thereby irradiating a subject with infrared light.

IR camera 102, which is also called an infrared light camera, may be constituted by a plurality of first pixels 21 of solid-state imaging element 20, lens 60, and band-pass filter 70, which are shown in FIG. 1. Such IR camera 102 acquires an IR image by performing imaging of a scene including a subject with infrared light according to the timing when light source 101 irradiates the subject with infrared light. Further, IR camera 102 measures the intensity of infrared light by the imaging of an IR image. That is, IR camera 102 has solid-state imaging element 20, and measures the intensity of the infrared light by performing imaging in which infrared light emitted from light source 101 and reflected by the subject is received by each of the plurality of first pixels 21 included in solid-state imaging element 20.

BW camera 103, which is also called a visible light camera, may be constituted by a plurality of second pixels 22 of solid-state imaging element 20, lens 60, and band-pass filter 70, which are shown in FIG. 1. Such BW camera 103 acquires a visible light image (specifically, a BW image) by performing imaging of a substantially same scene as that of the IR image, with visible light, at the same view point and the same time as those of the IR image. That is, BW camera 103 generates a BW image by performing imaging of a substantially same scene as that of the IR image, with visible light, at a substantially same viewpoint and time as those of the IR image, where, the IR image is formed based on the intensity of infrared light received by each of the plurality of first pixels 21 included in solid-state imaging element 20.

Memory 200 is a recording medium for storing an IR image obtained by the imaging with IR camera 102, and a BW image obtained by the imaging with BW camera 103. It should be noted that as described above, the IR image is formed based on the intensity of infrared light received by each of the plurality of first pixels 21 included in solid-state imaging element 20. Therefore, the IR image indicates the intensity of infrared light for each pixel. That is, it can be said that memory 200 stores the intensity of infrared light. It should be noted that specifically, such memory 200 may be a Read Only Memory (ROM), a Random Access Memory (RAM), an Solid State Drive (SSD), or the like and may be non-volatile or volatile. Further, memory 200 may be a hard disk.

Processor 110a acquires an IR image and a BW image from memory 200, calculates a depth image from the IR image, and detects a lower reflection region in the IR image based on the IR image and the BW image. Then, processor 110a corrects the depth of the region in the depth image corresponding to the lower reflection region. It should be noted that the lower reflection region is a region in which an object with a lower reflectivity to infrared light is shown in the IR image. This lower reflection region is a region that is detected by using a below-described first threshold, or the first threshold and a second threshold, and the reflectivity of the object is defined by the above-described threshold.

Such processor 110a includes light emission controller 113, IR acquirer 114, BW acquirer 115, depth calculator 111a, lower reflection region detector 112, and depth corrector 111b.

Light emission controller 113 controls light source 101. That is, light emission controller 113 causes light source 101 to emit light by outputting the above-described light emission signal to light source 101. As a result of this, infrared light is irradiated to the subject from light source 101, and reflection light which is light reflected by subject enters IR camera 102.

IR acquirer 114 acquires an IR image from IR camera 102 via memory 200. Here, each pixel of the IR image indicates the intensity of infrared light received at the position of the pixel as a pixel value (specifically, luminance). Therefore, IR acquirer 114 acquires the intensity of infrared light by acquiring the IR image. That is, IR acquirer 114 acquires the intensity of infrared light stored in memory 200, the intensity of infrared light being measured by imaging in which each of the plurality of first pixels 21 included in solid-state imaging element 20 receives infrared light irradiated from light source 101 and reflected by the subject.

BW acquirer 115 acquires a BW image from BW camera 103 via memory 200. That is, BW acquirer 115 acquires a BW image stored in memory 200, the BW image being generated by imaging, with visible light, a substantially same scene as that of the IR image at substantially same viewpoint and time as those of the IR image at substantially same viewpoint and time as those of the IR image, where, the IR image is formed based on the intensity of infrared light received by each of the plurality of first pixels 21 included in solid-state imaging element 20.

Depth calculator 111a generates a depth image by calculating the distance to the subject as the depth based on the intensity of the infrared light received by first pixel 21 for each of a plurality of first pixels 21 included in solid-state imaging element 20.

Lower reflection region detector 112 detects, based on the IR image and the BW image, a lower reflection region which is a region in which an object with a lower reflectivity to infrared light in the subject is shown.

Depth corrector 111b corrects the depth of a correction target region, which is a region in the depth image corresponding to the lower reflection region.

Such depth acquisition device 1 according to the present embodiment can accurately acquire a depth which is the distance to a subject even if an object with a lower reflectivity to infrared light (that is, a lower reflection object) is contained in the subject.

For example, if a lower reflection object is contained in the subject, the distance to the lower reflection object, that is, the depth, which is calculated based on the intensity of infrared light reflected by the lower reflection object, will be calculated to be larger than the actual depth. That is, correct depth is not shown in a region corresponding to the lower reflection object in the depth image.

However, in depth acquisition device 1 according to the present embodiment, a lower reflection region which is a region in which a lower reflection object is shown is detected in the IR image, and the region in the depth image corresponding to the lower reflection region is designated as a correction target region. That is, a region in which an inappropriate depth is shown in the depth image due to the lower reflection object being contained in the subject, is identified as the correction target region. Then, as a result of the depth of the correction target region being corrected, it becomes possible to accurately acquire a depth which is the distance to the lower reflection object.

[One Example of Each Image]

Figure 5:
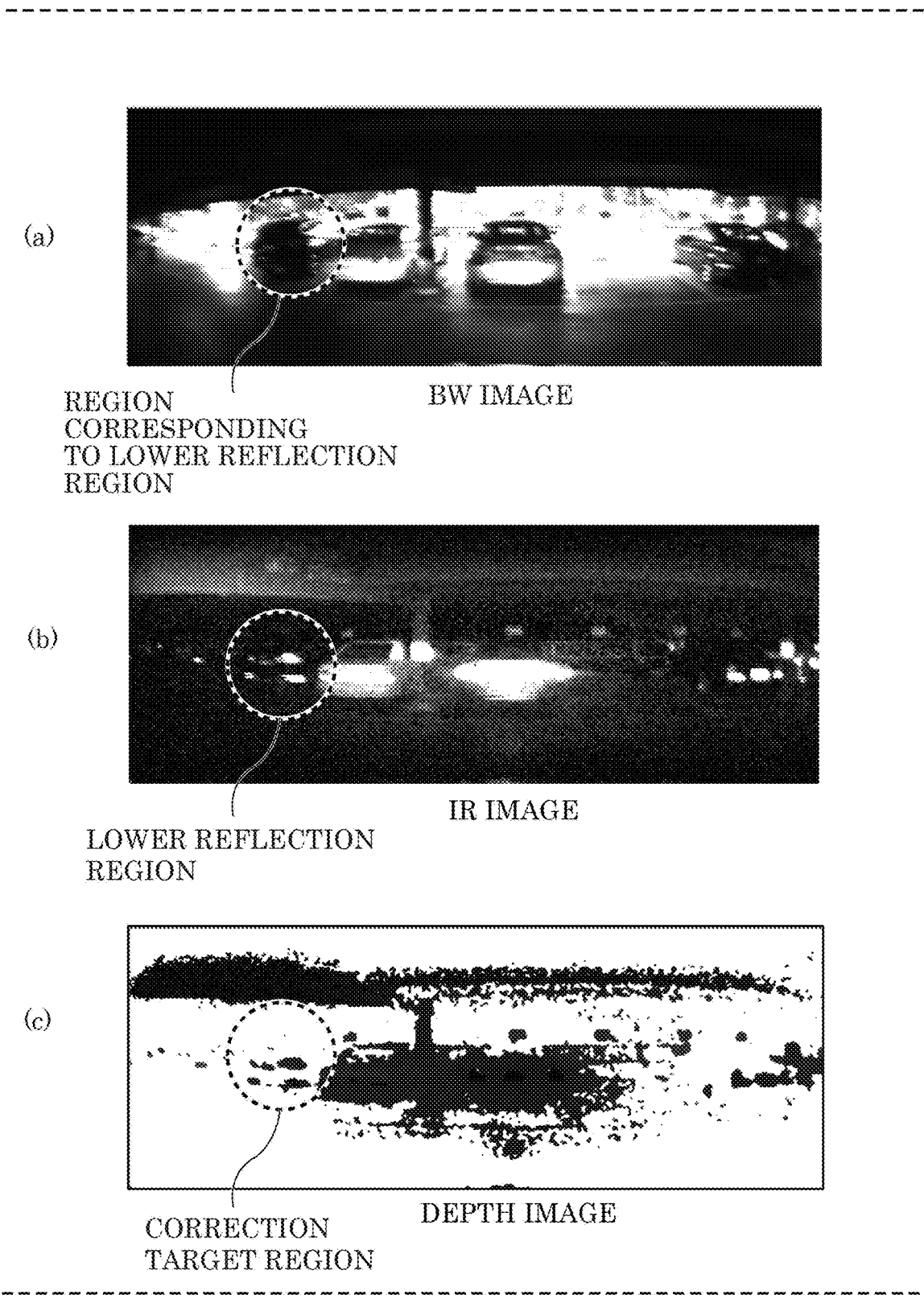
FIG. 5 is a diagram illustrating an example of a BW image, an IR image, and a depth image.

FIG. 5 shows an example of a BW image, an IR image, and a depth image.

A plurality of vehicles parked in a parking lot are shown in the BW image generated by the imaging with BW camera 103 and acquired by BW acquirer 115, for example, as shown in (a) of FIG. 5.

Further, a substantially same scene as that of the BW image shown in (a) of FIG. 5 is also shown in the IR image generated by the imaging with IR camera 102 and acquired by IR acquirer 114, as shown in (b) of FIG. 5. Further, the IR image shown in (b) of FIG. 5 is an image obtained by imaging at substantially the same viewpoint and the same time as those of the imaging of the BW image shown in (a) of FIG. 5. Therefore, in the BW image shown in (a) of FIG. 5 and the IR image shown in (b) of FIG. 5, the same object is shown in the regions corresponding to each other. It should be noted that the regions corresponding to each other are regions having the same position, size, and shape in each image.

Depth calculator 111a generates a depth image, for example, shown in (c) of FIG. 5 by calculating the depth based on the intensity of the infrared light received by concerned first pixel 21 for each of a plurality of first pixels 21 included in solid-state imaging element 20. The luminance of each pixel in the depth image is higher as the depth is larger, and conversely, is lower as the depth is smaller. The depth image shown in (c) of FIG. 5 corresponds to the IR image shown in (b) of FIG. 5. That is, the IR image shown in (b) of FIG. 5 is formed based on the intensity of infrared light received by each of the plurality of first pixels 21 included in solid-state imaging element 20 as described above. Further, the depth image shown in (c) of FIG. 5 is also generated based on the intensity of infrared light received by each of the plurality of first pixels 21. Therefore, the same object is shown in the regions corresponding to each other in the IR image shown in (b) of FIG. 5 and the depth image shown in (c) of FIG. 5.

Here, as shown in (b) of FIG. 5, a lower reflection region (that is, a region within a broken line circle in (b) of FIG. 5) exists in the IR image. This lower reflection region is a region in which an object having a low reflectivity to infrared light is shown. That is, in the BW image shown in (a) of FIG. 5, a nearby vehicle is shown in the region corresponding to the lower reflection region. However, luminance is lower in the lower reflection region of the IR image shown in (b) of FIG. 5. Consequently as shown in (c) of FIG. 5, in the region in the depth image corresponding to the lower reflection region (that is, the region in a broken line circle in (c) of FIG. 5), even though the depth which is the distance to the object is actually smaller, the depth is expressed as being larger (that is, higher in luminance).

Accordingly, lower reflection region detector 112 of depth acquisition device 1 according to the present embodiment detects the lower reflection region based on the BW image shown in (a) of FIG. 5 and the IR image shown in (b) of FIG. 5. Then, depth corrector 111b identifies a region in the depth image corresponding to the lower reflection region as a correction target region, and corrects the depth of the correction target region. Specifically depth corrector 111b corrects the lower reflection region of the depth image based on the BW image, and outputs the depth image after correction. It should be noted that the lower reflection region of the depth image is a region in the depth image corresponding to the lower reflection region of the IR image described above, and is also referred to as a correction target region. For example, depth corrector 111b outputs a depth image after correction to the display thereby causing the depth image to be displayed on the display. Alternatively depth corrector 111b may output the depth image after correction to a control unit, such as an Electronic Control Unit (ECU) mounted on a vehicle, thereby causing the control unit to execute drive control of the vehicle based on the depth image after correction.

Figure 6:
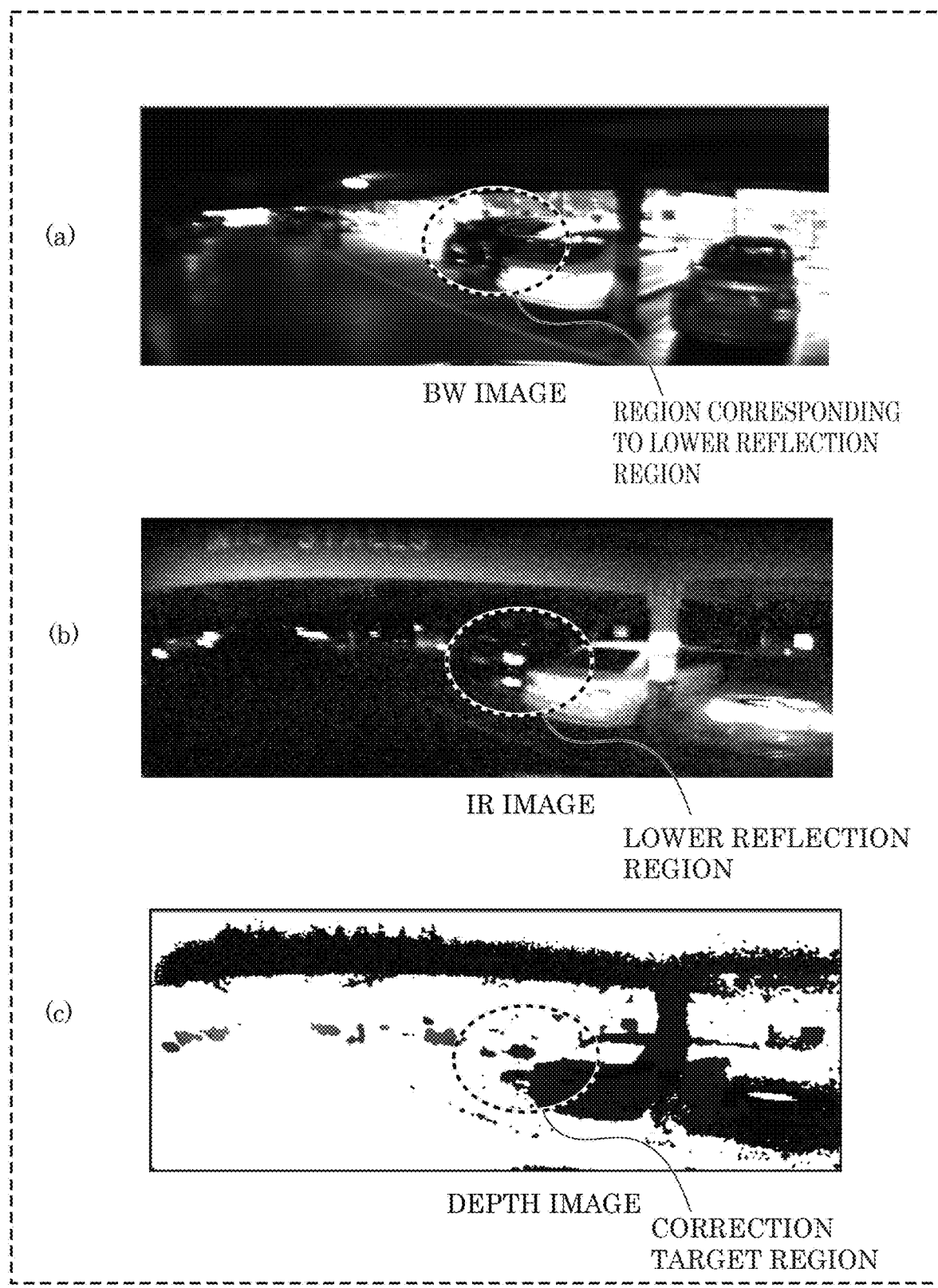
FIG. 6 is a diagram illustrating another example of a BW image, an IR image, and a depth image.

FIG. 6 shows another example of the BW image, the IR image, and the depth image.

The BW image generated by the imaging with BW camera 103 and acquired by BW acquirer 115 shows, for example, a plurality of vehicles parked in a parking lot as shown in (a) of FIG. 6.

Further, the IR image generated by the imaging with IR camera 102 and acquired by IR acquirer 114 also shows a substantially same scene as that of the BW image shown in (a) of FIG. 6, as shown in (b) of FIG. 6. Further, the IR image shown in (b) of FIG. 6 is an image that is imaged at substantially same viewpoint and same time as those of the BW image shown in (a) of FIG. 6. Therefore, in the BW image shown in (a) of FIG. 6 and the IR image shown in (b) of FIG. 6, the same subject is shown in regions corresponding to each other.

Depth calculator 111a generates a depth image shown, for example, in (c) of FIG. 6 by calculating a depth based on the intensity of infrared light received by concerned first pixel 21 for each of the plurality of first pixels 21 included in solid-state imaging element 20. The depth image shown in (c) of FIG. 6 corresponds to the IR image shown in (b) of FIG. 6.

Here, as shown in (b) of FIG. 6, the IR image has a lower reflection region (that is, a region within a broken line circle in (b) of FIG. 6). This lower reflection region is a region in which an object having a lower reflectivity to infrared light is shown. That is, in the BW image shown in (a) of FIG. 6, a nearby vehicle is shown in the region corresponding to the lower reflection region. However, luminance is low in the lower reflection region of the IR image shown in (b) of FIG. 6. Consequently, as shown in (c) of FIG. 6, in the region in the depth image corresponding to the lower reflection region (that is, the region in a broken line circle in (c) of FIG. 5), even though the depth which is the distance to the object is actually smaller, depth is expressed as being larger (that is, higher in luminance).

Accordingly, lower reflection region detector 112 of depth acquisition device 1 according to the present embodiment detects the lower reflection region based on the BW image shown in (a) of FIG. 6 and the IR image shown in (b) of FIG. 6. Then, depth corrector 111b identifies a region in the depth image corresponding to the lower reflection region as a correction target region, and corrects the depth of the correction target region.

Figure 7:
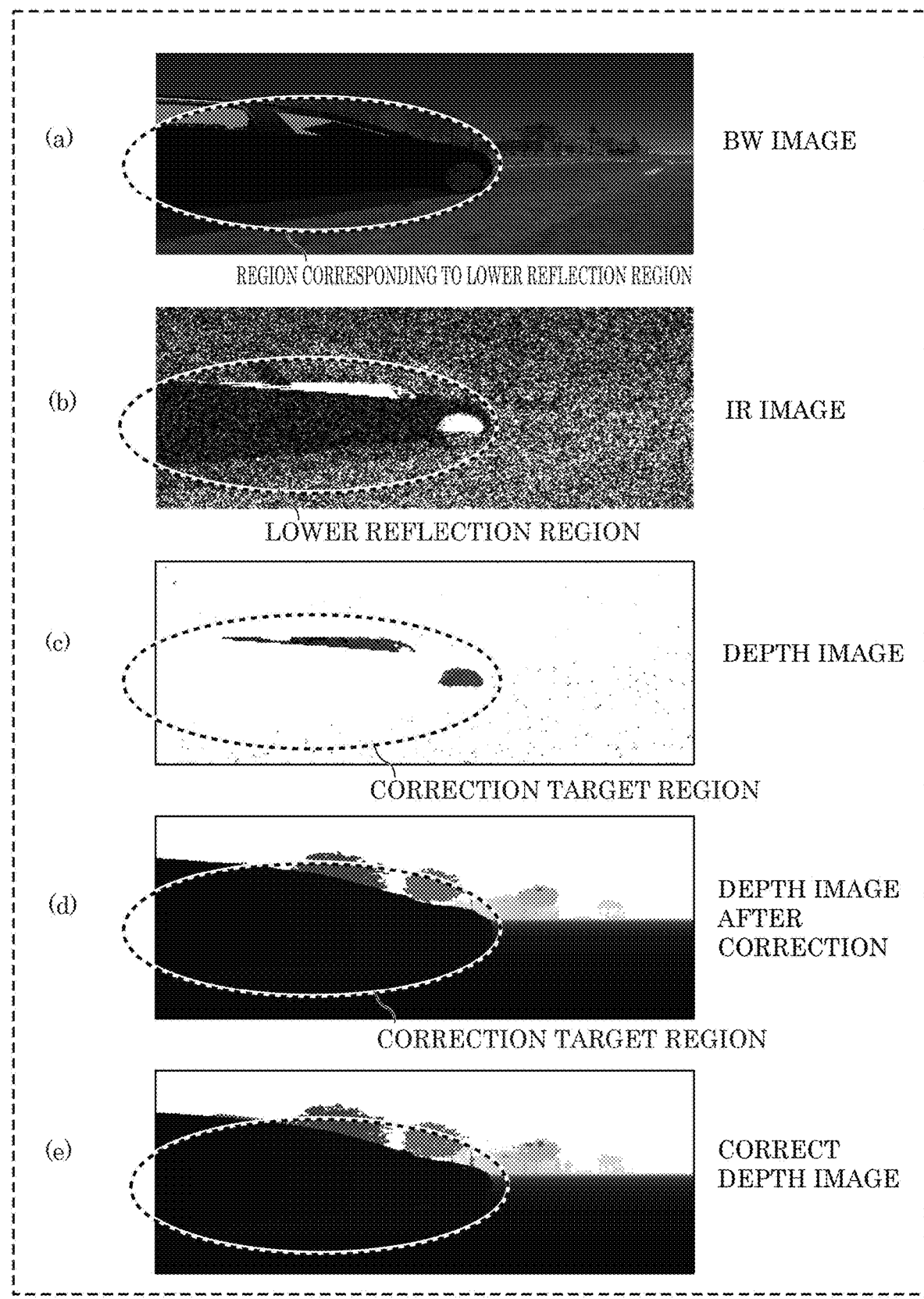
FIG. 7 is a diagram illustrating a simulation result of a depth acquisition device according to Embodiment.

FIG. 7 shows a simulation result of depth acquisition device 1.

Depth acquisition device 1 acquires the BW image shown in (a) of FIG. 7 by the imaging with BW camera 103, and further acquires the IR image shown in (b) of FIG. 7 by the imaging with IR camera 102. The BW image and the IR image are images obtained by imaging the same scene at the same viewpoint and the same time. In the example shown in (b) of FIG. 7, there is a large lower reflection region (that is, the region in a broken line circle in (b) of FIG. 7) on the left side in the IR image.

Depth calculator 111a generates the depth image shown in (c) of FIG. 7 based on the intensity of the infrared light forming the IR image. Even though a nearby object is shown in the region corresponding to the lower reflection region in the BW image shown in (a) of FIG. 7, the depth of the lower reflection region is inappropriately expressed as being larger in the depth image shown in (c) of FIG. 7. That is, even though the object is shown in proximity in the BW image, the object is expressed as if being far away in the depth image.

Depth corrector 111b treats a region in the depth image shown in (c) of FIG. 7 corresponding to the lower reflection region as a correction target region, and corrects the depth of the correction target region, thereby generating a depth image after correction shown in (d) of FIG. 7. For example, depth corrector 111b corrects the depth of the correction target region by using the image of a region in the BW image shown in (a) of FIG. 7 corresponding to the lower reflection region. Further, depth corrector 111b may make adjustments such as adding an offset to the overall luminance of the depth image.

Consequently, depth acquisition device 1 according to the present embodiment can bring the depth image after correction closer to the correct depth image shown in (e) of FIG. 7.

[Processing Flow]

Figure 8:
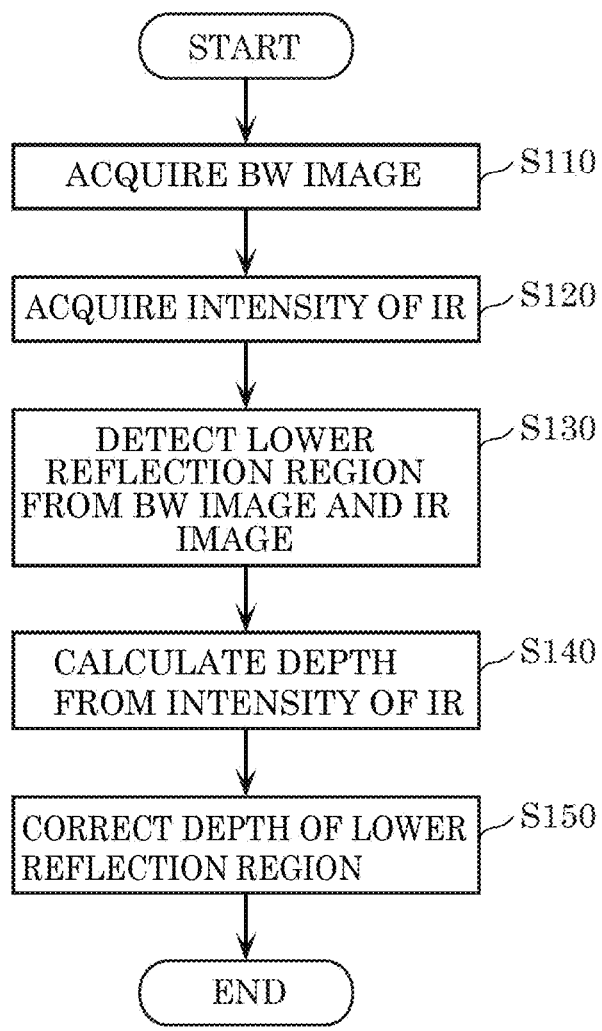
FIG. 8 is flowchart illustrating overall processing operation of the depth acquisition device according to Embodiment.

FIG. 8 is a flowchart illustrating overall processing operation of depth acquisition device 1 according to the present embodiment.

(Step S110)

First, BW camera 103 generates a BW image by performing imaging with visible light. Then, BW acquirer 115 acquires the BW image via memory 200.

(Step S120)

Next, IR camera 102 performs imagining with infrared light, and thereby measures the intensity of the infrared light. Then, IR acquirer 114 acquires the intensity of the infrared light via memory 200. Here, the intensity of infrared light to be acquired is the intensity of the infrared light received by each of a plurality of first pixels 21 of solid-state imaging element 20. Therefore, IR acquirer 114 acquires those intensities of the infrared light, and thereby acquires an IR image which is formed based on those intensities of infrared light.

Specifically, the intensity of the infrared light acquired from memory 200 consists of at least three intensities measured by the exposure of solid-state imaging element 20 at at least three mutually different timings, when the infrared light emitted from light source 101 and reflected by the subject is received by solid-state imaging element 20. For example, as shown in FIG. 3, the intensity of infrared light consists of three intensities measured in a first exposure period, a second exposure period, and a third exposure period. For example, each pixel value included in the IR image of one frame is indicated as a cumulative value of the intensities of infrared light measured by the exposure at at least three timings.

(Step S130)

Next, lower reflection region detector 112 detects a lower reflection region in the IR image based on the BW image acquired in step S110 and the IR image acquired in step S120.

(Step S140)

Next, depth calculator 111a calculates the depth based on the intensity of the infrared light acquired in step S120. That is, for each of a plurality of first pixels 21 included in solid-state imaging element 20, depth calculator 11a calculates the distance to a subject as a depth based on the intensity of the infrared light received by that first pixel 21, thereby generating a depth image. Specifically, for each of the plurality of first pixels 21 included in solid-state imaging element 20, depth calculator 111a calculates a depth based on the above-described at least three intensities measured by that first pixel 21, thereby generating a depth image. For example, depth calculator 111a calculates the depth using the above-described (Equation 1) according to the ToF distance measurement method.

(Step S150)

Next, depth corrector 111b corrects the depth of a region in the depth image corresponding to a lower reflection region, that is, a correction target region.

Figure 9:
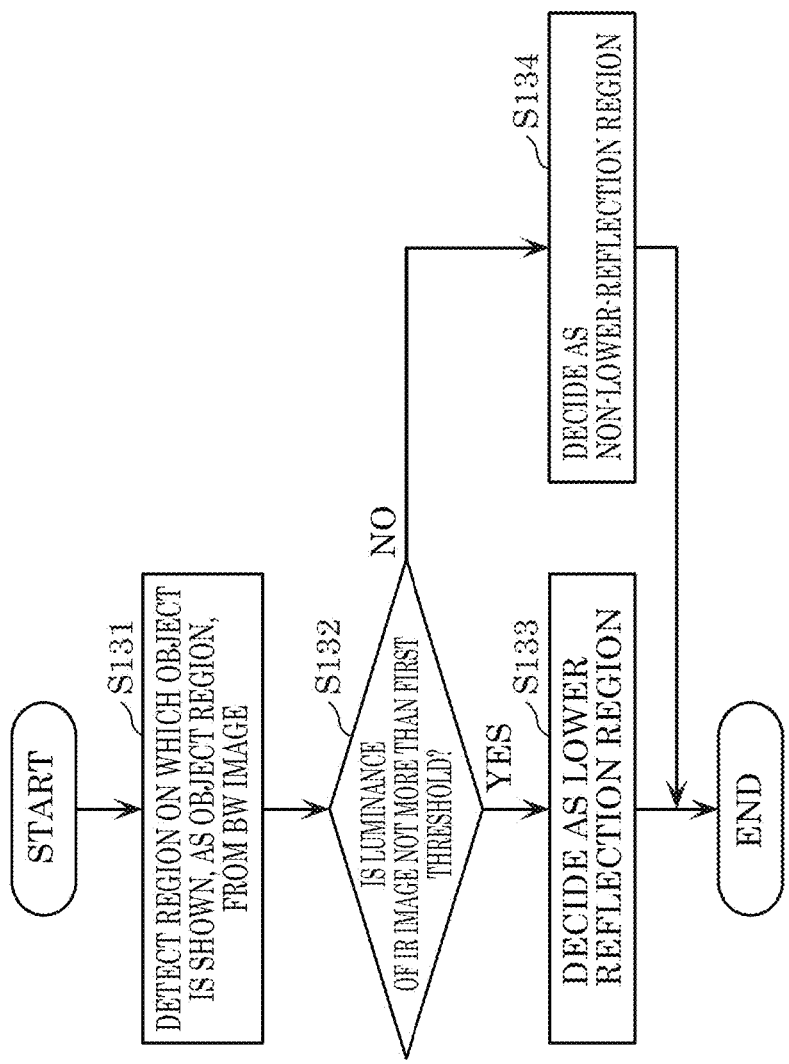
FIG. 9 is a flowchart illustrating an example of processing operation of a lower reflection region detector according to Embodiment.

FIG. 9 is a flowchart illustrating an example of processing operation of lower reflection region detector 112. It should be noted that FIG. 9 shows the processing of step S130 of FIG. 8 in detail.

(Step S131)

First, lower reflection region detector 112 detects a region in which an object is shown in the BW image, as an object region. If a plurality of objects are shown in the BW image, lower reflection region detector 112 detects the region in which an object is shown, as the object region, for each of the plurality of objects. For example, lower reflection region detector 112 detects an object region by processing such as pattern matching or image recognition. Further, lower reflection region detector 112 may detect a region of not less than a predetermined size as an object region.

(Step S132)

Next, lower reflection region detector 112 determines whether or not the luminance of a determination target region, which is a region in the IR image corresponding to the object region, is not more than a first threshold. The luminance of the determination target region may be, for example, the average value of the luminance of each pixel included in the determination target region.

(Step S133)

Upon determining that the luminance of the determination target region is not more than first threshold (Yes in step S132), lower reflection region detector 112 decides that the determination target region is the lower reflection region.

(Step S134)

On the other hand, upon determining that the luminance of the determination target region is more than first threshold (No in step S132), lower reflection region detector 112 decides that the determination target region is a non-lower-reflection region.

In this way, lower reflection region detector 112 according to the present embodiment detects a region in which an object is shown in the BW image as an object region. Then, lower reflection region detector 112 determines whether or not the luminance of the determination target region, which is a region in the IR image corresponding to the object region, is not more than the first threshold, and detects, as a lower reflection region, the determination target region which has been determined to have a luminance not more than the first threshold.

As a result, in the present embodiment, a region in which an object is shown is detected as the object region from the BW image. It is highly possible that the object shown in the object region detected in this way is not in the distant background but in proximity, and the object is irradiated with infrared light from light source 101. If the luminance in the region in the IR image corresponding to the object region is lower, it is highly possible that the object is a lower reflection object. Therefore, in the present embodiment, since a region in the infrared light image corresponding to the object region and having a luminance of not more than the first threshold is detected as a lower reflection region, it is possible to appropriately detect the lower reflection region.

Figure 10:
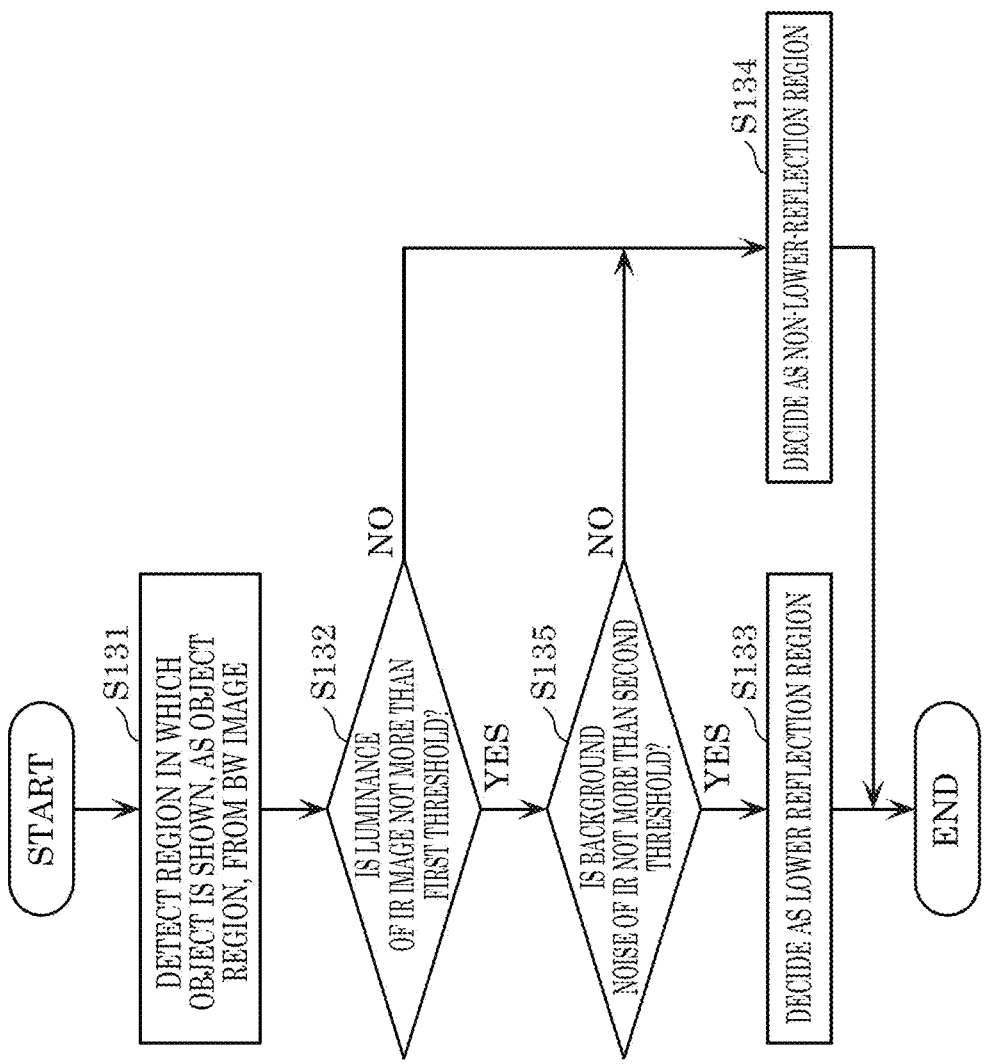
FIG. 10 is a flowchart illustrating another example of processing operation of the lower reflection region detector according to Embodiment.

FIG. 10 is a flowchart illustrating another example of processing operation of lower-reflection region detector 112. It should be noted that FIG. shows the processing of step S130 of FIG. 8 in detail.

The flowchart shown in FIG. 10 includes each step of the flowchart shown in FIG. 9, and further includes step S135.

(Step S135)

Upon determining that the luminance of the determination target region is not more than the first threshold (Yes of step S132), lower reflection region detector 112 further determines whether or not the intensity of the background noise of infrared light in the determination target region is not more than a second threshold. Hereinafter, the intensity of background noise is also referred to as noise intensity.

Specifically, the intensity of the infrared light acquired by IR acquirer 114 consists of at least three intensities measured by exposure of solid-state imaging element 20 at at least three mutually different timings as described above. That is, as shown in FIG. 3, the intensity of infrared light consists of three intensities measured in a first exposure period, a second exposure period, and a third exposure period. For example, the noise intensity is the smallest intensity of those at least three intensities. For example, in the case of the example shown in FIG. 3, lower reflection region detector 112 treats the intensity of infrared light measured by the exposure in the third exposure period as the noise intensity. That is, lower reflection region detector 112 determines whether or not the intensity of the infrared light measured by the exposure in the third exposure period is not more than the second threshold.

Upon determining that the noise intensity is not more than the second threshold (Yes in step S135), lower reflection region detector 112 decides that the determination target region of the noise intensity is the lower reflection region (step S133). On the other hand, upon determining that the noise intensity is more than the second threshold (No in step S135), lower reflection region detector 112 decides that the determination target region of the noise intensity is a non-lower-reflection region (step S134).

As described above, lower reflection region detector 112 in the present embodiment further determines whether or not, within the intensity of the infrared light acquired by IR acquirer 114, the noise intensity included in the intensity of the infrared light in the determination target region is not more than the second threshold. Then, lower reflection region detector 112 detects the determination target region of noise intensity which has been determined to be not more than the second threshold, as the lower reflection region.

For example, the subject may be irradiated not only with infrared light from light source 101 but also with infrared light contained in external light such as sunlight. Therefore, the intensity of infrared light contained in the external light is treated as noise intensity and an infrared light image is formed based on the intensity of infrared light excluding the noise intensity. However, if the noise intensity is large, such as in bright daytime, the luminance of the infrared light image becomes lower since the noise intensity is removed. Therefore, if the noise intensity is large, even if the luminance of the region in the infrared light image corresponding to the object region of the BW image is low as described above, there is possibility that region may not be the lower reflection region. Therefore, in the present embodiment, since the region having a small noise intensity which has been determined to be not more than the second threshold is detected as the lower reflection region, it is possible to appropriately detect the lower reflection region.

Figure 11:
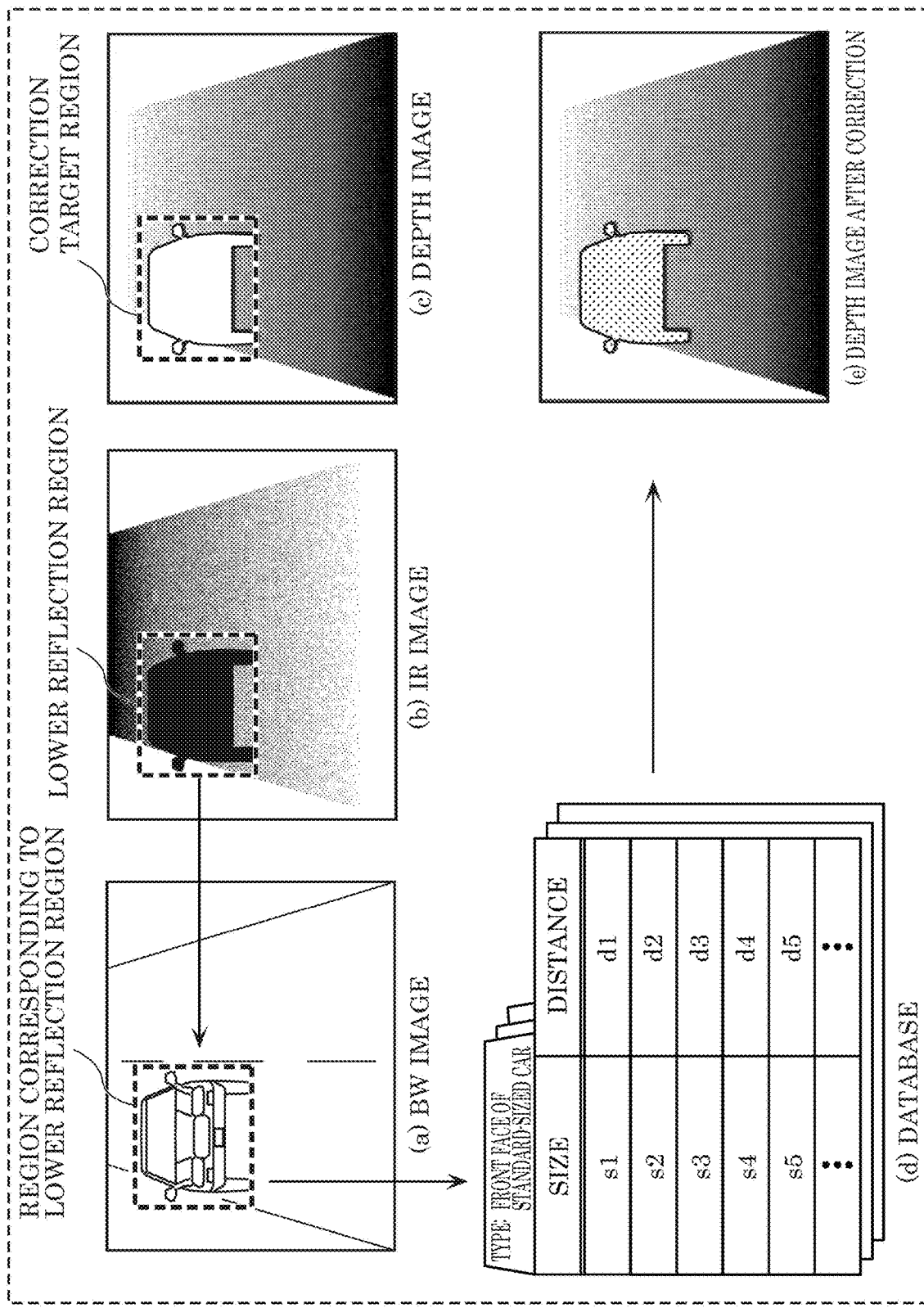
FIG. 11 is a diagram illustrating an example of correction of a depth image by a depth corrector according to Embodiment.

FIG. 11 shows an example of correction of a depth image by depth corrector 111b.

Depth corrector 111b corrects the depth of the correction target region in the depth image shown in (c) of FIG. 11, thereby generating a depth image after correction shown in (e) of FIG. 11.

Specifically, the depth image shown in (c) of FIG. 11 is calculated based on the intensity of infrared light forming the IR image shown in (b) of FIG. 11. Lower reflection region detector 112 detects the lower reflection region from this IR image. Depth corrector 111b identifies the type of the object shown in that region based on the image of the region in the BW image corresponding to the lower reflection region. For example, depth corrector 111b identifies the type of the object shown in that region by processing such as pattern matching or image recognition. Further, a learning model such as a neural network may be used to identify the type of the object. In the example shown in FIG. 11, depth corrector 111b identifies the front of a standard size car as the type of the object. Further, depth corrector 111b identifies the size of the object which is shown in that region. The size of the object may be a horizontal width or a vertical width (that is, a height) of the image of the object, or an area of the image of the object or a length of the diagonal of a rectangular frame that surrounds the image of the object.

Then, as shown in (d) of FIG. 11, depth corrector 111b refers to a database showing the correspondence between the size and the distance of that type for each type of the object. For example, the database shows the correspondence between the size and the distance of that object when the type of the object is the front of a standard size car. Specifically, the database shows the size "s1" associated with the distance "d1" and the size "s2" associated with the distance "d2". Depth corrector 111b refers to such a database and estimates the distance associated with the type and the size of the identified object as the distance to the object, that is, the depth. For example, if the identified size is "s2", depth corrector 111b estimates the distance "d2" associated with the size "s2" as the depth of the correction target region. Then, depth corrector 111b corrects the depth of the correction target region by replacing the depth of the correction target region in the depth image shown in (c) of FIG. 11 with the estimated depth. As a result, the depth image shown in (c) of FIG. 11 is converted into a depth image after correction shown in (e) of FIG. 11.

The database shown in (d) of FIG. 11 may be stored in depth acquisition device 1, or may be stored in a server or the like outside depth acquisition device 1. When the database is stored in the server, depth corrector 111b accesses the server via, for example, a communication network, and refers to the database.

Further, while the database shown in (d) of FIG. 11 shows the correspondence of the type and size of the object, with the distance thereof, the type of the object may include a silhouette, that is, the orientation of the object as seen from BW camera 103 (for example, the front, the side, or the back, etc.). Further, when the lens of BW camera 103 is an optical lens having a wide viewing angle, such as a fisheye lens, not only the type and size of the object but also the position of the region in which the object is shown in the BW image may also be associated with the above-described distance in the database. In this case, depth corrector 111b further identifies, from the BW image, the position of the region where the object is shown, and estimates the distance associated with the type, size, and position of the identified object in the database, as the depth of the correction target region. It should be noted that the type of the object may be not only the vehicle but also a license plate, etc. included in the vehicle.

Figure 12:
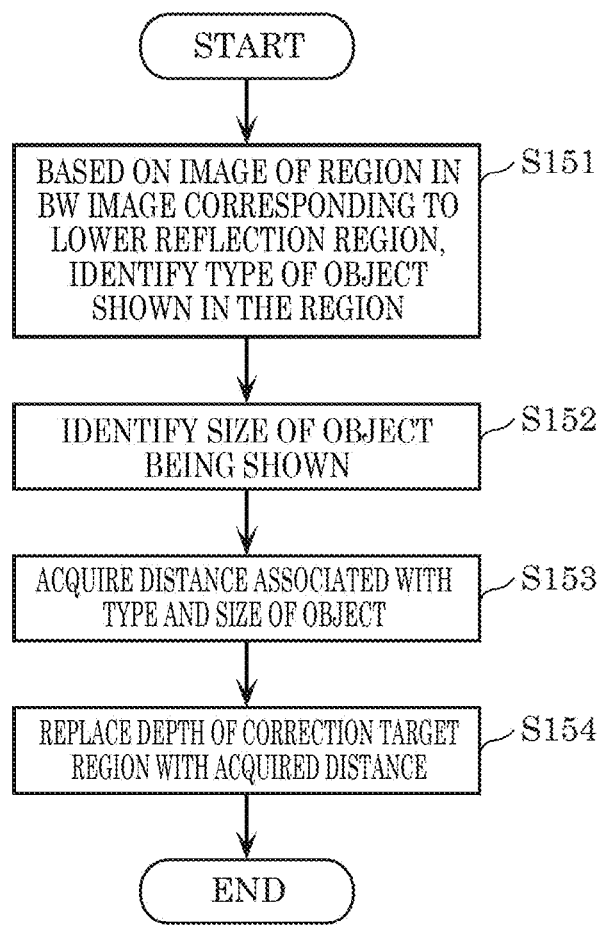
FIG. 12 is a flowchart illustrating processing operation of correction by the depth corrector according to Embodiment.

FIG. 12 is a flowchart illustrating processing operation of correction by depth corrector 111b. It should be noted that FIG. 12 shows the processing of step S150 of FIG. 8 in detail.

(Step S151)

Depth corrector 111b, based on the image of a region in the BW image corresponding to a lower reflection region, identifies the type of the object which is shown in the region.

(Step S152)

Next, depth corrector 111b identifies the size of the object shown in that region.

(Step S153)

Next, depth corrector 111b acquires a distance associated with the type identified in step S151 and the size identified in step S152.

(Step S154)

Then, depth corrector 111b replaces the depth of a correction target region in the depth image with the distance acquired in step S154. As a result of this, the depth of the correction target region is corrected.

In this way, depth corrector 111b according to the present embodiment identifies the type of the object shown in a region based on the image of the region in the BW image corresponding to a lower reflection region. Then, depth corrector 111b corrects the depth of the correction target region by estimating the depth of the region based on the identified type of the object and the size of the object shown in the region.

This makes it possible, with use of the above-described database, to estimate an appropriate depth based on the type and size of an object identified based on the image of a region in the BW image corresponding to a lower reflection region. Consequently it is possible to correct the depth of a correction target region to a correct depth. It should be noted that although database was used in the above-described example, any means may be used provided it is means to indicate correspondence of the type and size of an object with the depth thereof. For example, instead of that database, a function may be used, or a learning model such as a neural network may be used.

Figure 13:
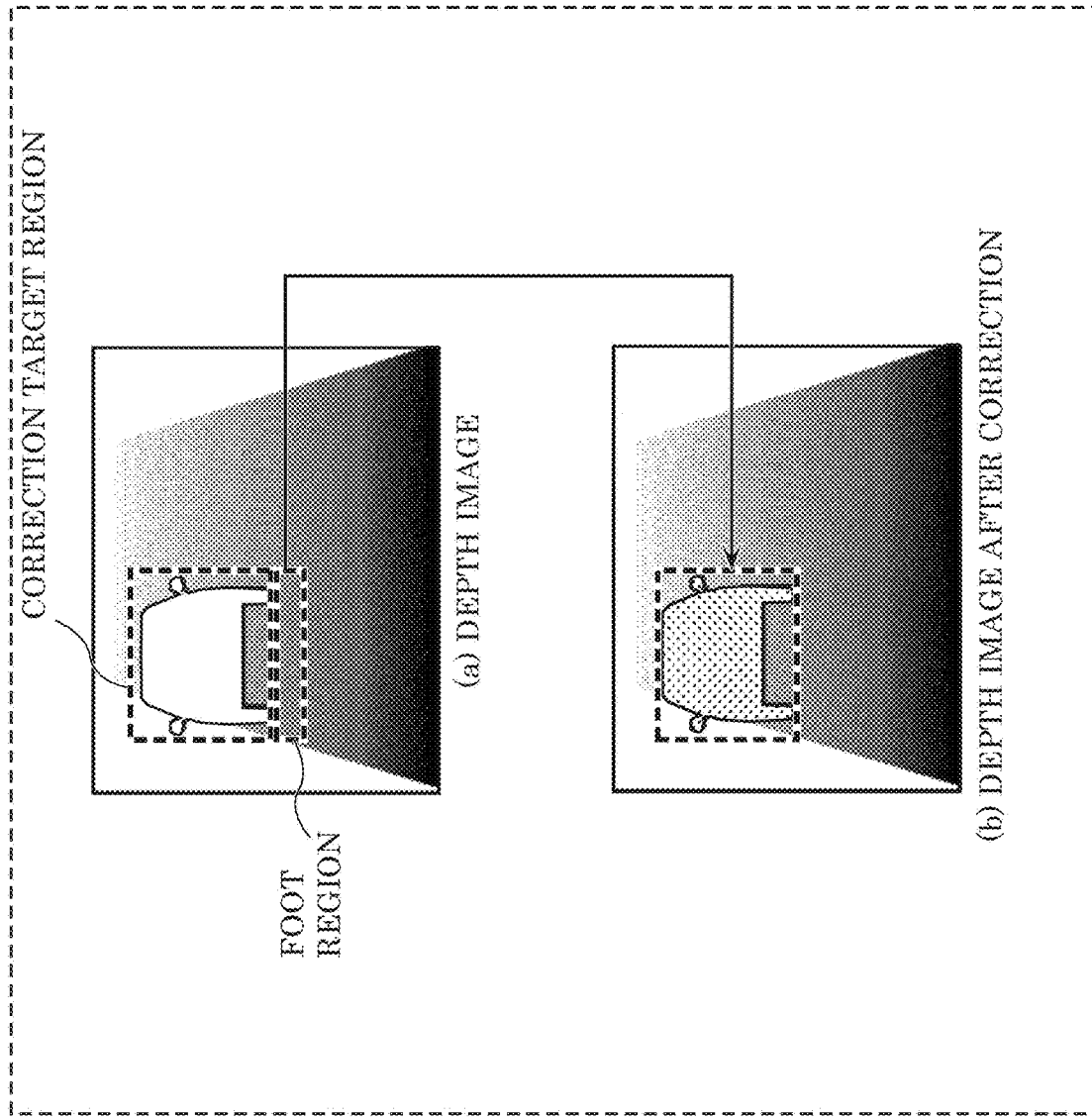
FIG. 13 is a diagram illustrating another example of correction of a depth image by the depth corrector according to Embodiment.

FIG. 13 shows another example of correction of a depth image by depth corrector 111b.

When correcting the depth of a correction target region in a depth image, depth corrector 111b may use the depth of a region below the correction target region. For example, depth corrector 111b corrects the depth of the correction target region of the depth image shown in (a) of FIG. 13. At this moment, depth corrector 111b uses the depth of a foot region lying below the correction target region. That is, depth corrector 111b replaces the depth of the correction target region with the depth of the foot region. In other words, depth corrector 111b corrects the depth of the correction target region to the depth of the region lying below the correction target region.

When the lower reflection object is a vehicle as in the example shown in FIG. 13, the foot of the vehicle is the road surface, and the depth of the road surface is close to the depth of the vehicle. Therefore, in the present embodiment, since the depth of the correction target region is corrected to the depth of a region below the correction target region, it is possible to correct the depth of the correction target region to an accurate depth.

(Variation)

In the above-described embodiment, although a lower reflection region is detected to correct the depth, the depth may be corrected by using a learning model without detecting the lower reflection region.

Figure 14:
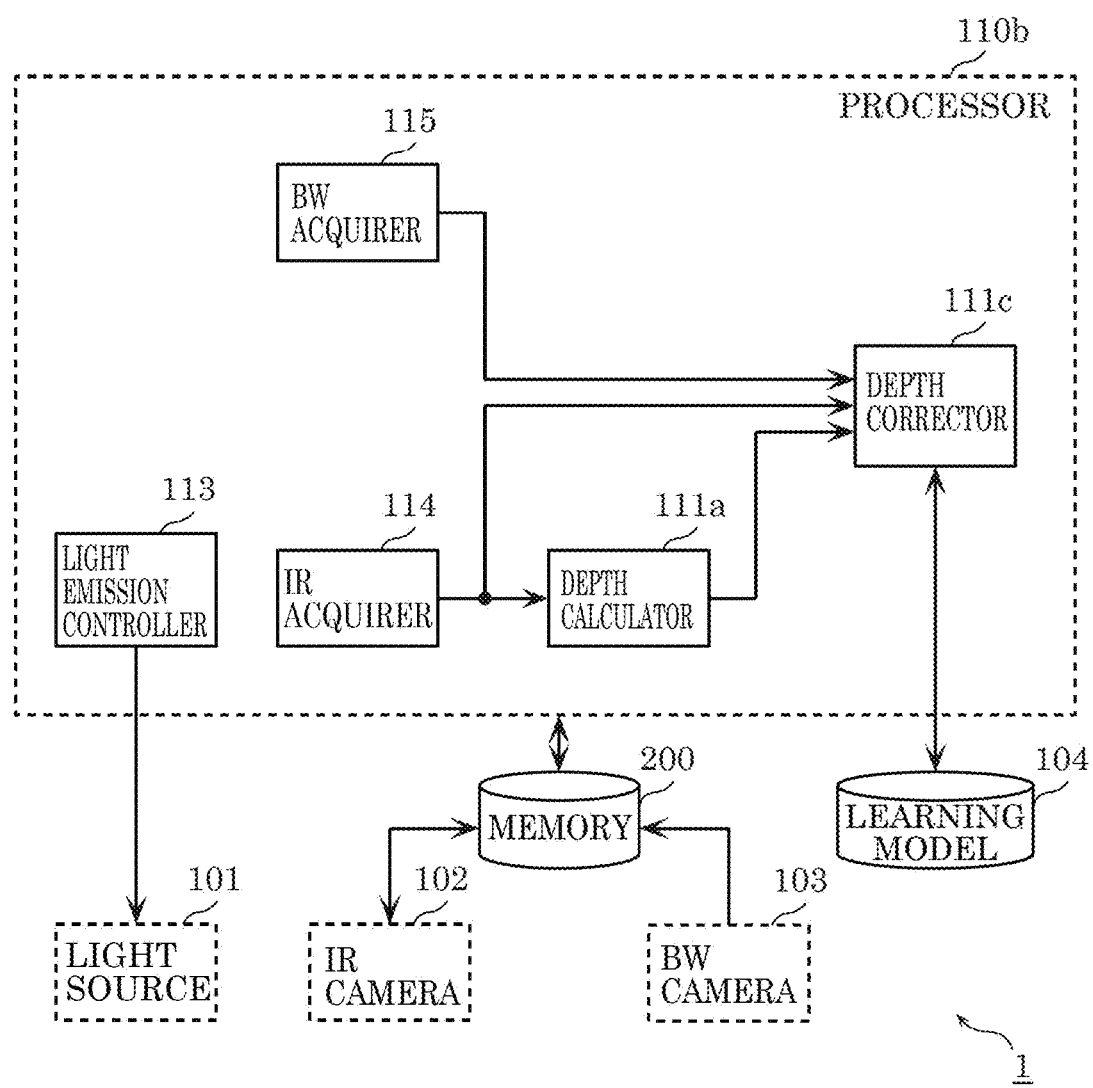
FIG. 14 is a block diagram illustrating an example of a functional structure of a depth acquisition device according to a variation of Embodiment.

FIG. 14 is a block diagram illustrating an example of a functional structure of depth acquisition device 1 according to the present variation. It should be noted that among components shown in FIG. 14, the same component as the component shown in FIG. 14 is given the same reference mark, and detailed description thereof will be omitted.

Depth acquisition device 1 according to the present variation includes processor 110b instead of processor 110a shown in FIG. 4, and further includes learning model 104.

Learning model 104 is, for example, a neural network and is constituted by deep learning. For example, as the input data to be inputted into learning model 104, the BW image, the IR image, and the depth image are used. This learning model 104 has already been trained such that a correct depth image after correction is outputted for the combination of those input data.

Processor 110b does not include lower reflection region detector 112 shown in FIG. 4, and includes depth corrector 111c in place of depth corrector 111b shown in FIG. 4.

Depth corrector 111c inputs the above-described input data into the above-described learning model 104. As a result, depth corrector 111c acquires the depth image after correction from learning model 104, as output data for the input data. Further, depth corrector 111c outputs the depth image after correction. For example, depth corrector 111c outputs the depth image after correction to the display, thereby causing the depth image to be displayed on the display. Alternatively, depth corrector 111c outputs the depth image after correction to a control unit such as an ECU mounted on the vehicle, and thereby causes the control unit to execute driving control of the vehicle based on the depth image after correction.

That is, depth acquisition device 1 shown in FIG. 14 includes memory 200 and processor 110b. Processor 110b acquires the intensity of infrared light stored in memory 200, the intensity of infrared light being measured by imaging in which the infrared light emitted from light source 101 and reflected by a subject is received by each of a plurality of first pixels 21 included in solid-state imaging element 20. Further, processor 110b calculates the distance to the subject as the depth for each of the plurality of first pixels 21 included in solid-state imaging element 20 based on the intensity of the infrared light received by first pixel 21, and thereby generates a depth image. Further, processor 110b acquires a BW image stored in memory 200, the BW image being generated by imaging, with visible light, a substantially same scene as that of the IR image, at substantially same viewpoint and time as those of the IR image, where, the IR image is formed based on the intensity of infrared light received by each of the plurality of first pixels 21 included in solid-state imaging element 20. Then, processor 110b corrects the depth of the depth image by inputting the depth image, the IR image, and the BW image into learning model 104, and outputs the depth image after correction.

This makes it possible to appropriately correct the depth of the depth image without detecting a lower reflection region provided learning model 104 is trained in advance to output a correct depth image after correction upon input of the depth image, the IR image, and the BW image.

As described so far, in depth acquisition device 1 according to the present embodiment and its variation, even if a lower reflection object is included in the subject, it is possible to accurately acquire the depth, which is the distance to the subject.

It should be noted that each of the elements in the above-described embodiment may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory. The software program for realizing the depth acquisition device according to any of the above-described embodiment and its variations causes a computer to execute the steps in a corresponding one of the flowcharts in FIGS. 8 to 10 and 12.

Although the depth acquisition devices according to one or more aspects of the present disclosure have been described based on the embodiment and its variations, the present disclosure is not limited to them. Those skilled in the art will readily appreciate that an embodiment arrived at by making various modifications to the above embodiment and variations or an embodiment arrived at by selectively combining elements disclosed in the above embodiment and variations without materially departing from the scope of the present disclosure may be included within one or more aspects of the present disclosure.

For example, depth calculator 111a calculates a depth based on intensities of three infrared lights measured at three different exposure timings. However, each of the number of the exposure timings and the number of the intensities of three infrared lights is not limited to three and may be four or more.

Furthermore, although depth acquisition device 1 includes learning model 104 according to the variation of the embodiment, depth acquisition device 1 may not include learning model 104. In this case, depth acquisition device 1 may, for example, provide the above-described input data to learning model 104 via a communication network, and acquire, via the communication network, corrected depth image which is output data of learning model 104.

It should also be noted that all or a part of the units and the devices according to the present disclosure or all or a part of the functional blocks in the block diagrams of FIGS. 1, 4, and 14 may be implemented into one or more electronic circuits including a semiconductor device, a semiconductor Integrated Circuit (IC), or a Large Scale Integration (LSI). The LSI or the IC may be integrated into a single chip, or may be a combination of multiple chips. For example, the functional blocks except the storage element may be integrated into a single chip. Here, the LSI or the IC may be referred differently depending on the degree of integration, and may also be referred to as a system LSI, a Very Large Scale Integration (VLSI), or an Ultra Large Scale Integration (ULSI). A Field Programmable Gate Array (FPGA) which is programmable after manufacturing an LSI or a reconfigurable logic device capable of reconfiguring the connections or circuit segmentation in the LSI circuit may be used for the same purpose.

Furthermore, functions or operations of all or a part of the units, the devices, or a part of the devices may be realized by executing a software program. In this case, the software program is recorded on one or more nontransitory recording mediums such as a Read Only Memory (ROM), an optical disk, or a hard disk drive. When the software program is executed by a processor, the software program causes the processor and its peripheral devices to execute specific functions in the software program. The system or the device may include such one or more non-transitory recording medium on which the software program is recorded, a processor, and necessary hardware devices such as an interface.

INDUSTRIAL APPLICABILITY

The present disclosure is applicable to depth acquisition devices that acquire a depth to a subject of image, for example, applicable to in-vehicle devices and the like.

What is claimed is:
1. A depth acquisition device, comprising:
a memory; and
a processor, wherein
the processor is configured to perform:
acquiring intensities of infrared light which are stored in the memory, the intensities being measured by imaging performed by receiving the infrared light reflected on a subject by respective pixels in an imaging element, the infrared light having been emitted from a light source and an infrared light image being generated based on the intensities of the infrared light received by the respective pixels in the imaging element;
generating a depth image, by calculating a distance to the subject as a depth for each of the respective pixels in the imaging element, based on an intensity received by the pixel among the intensities of the infrared light;
acquiring a visible light image stored in the memory, the visible light image being generated by imaging: 1) substantially a same scene as a scene of the imaging of the infrared light image, 2) substantially a same viewpoint as a viewpoint of the imaging of the infrared light image, and 3) at a substantially a same timing as a timing of the imaging of the infrared light image;
detecting a lower reflection region showing an object in the infrared light image in accordance with the infrared light image and the visible light image, the object having a lower reflectivity to the infrared light among the subject;
correcting a lower reflection region in the depth image corresponding to the lower reflection region in the infrared image using the visible light image; and
outputting the depth image with the lower reflection region corrected.
2. The depth acquisition device according to claim 1, wherein
the detecting of the lower reflection region includes:
detecting a region showing an object in the visible light image as an object region;
determining whether or not an illuminance of a determination target region corresponding to the object region in the infrared light image is not greater than a first threshold; and detecting, as the lower reflection region, the determination target region having the illuminance determined as not being greater than the first threshold.

3. The depth acquisition device according to claim 2, wherein
the detecting of the lower reflection region further includes:
determining whether or not a noise intensity in the determination target region is not greater than a second threshold, the noise intensity being among the intensities of the infrared light which are acquired from the memory; and
detecting, as the lower reflection region, the determination target region having the noise intensity determined as not being greater than the second threshold.

4. The depth acquisition device according to claim 3, wherein
the intensities of the infrared light which are acquired from the memory include three or more intensities for each of the respective pixels in the imaging element, the three or more intensities being measured by exposure of the imaging element at three or more different timings when each of the respective pixels in the imaging element receives the infrared light reflected on the subject after the light source emits the light, and
in the generating of the depth image,
the depth image is generated by calculating a depth for each of the respective pixels in the imaging element in accordance with the three or more intensities measured for the pixel.

5. The depth acquisition device according to claim 4, wherein
the noise intensity is a lowest intensity among the three or more intensities.

6. The depth acquisition device according to claim 1, wherein
the correcting of the lower reflection region in the depth image includes:
identifying a type of the object shown in a region corresponding to the lower reflection region in the visible light image, in accordance with image of the region in the visible light image; and
correcting a depth of the lower reflection region in the depth image, by estimating a depth of the region in the visible light image based on the identified type of the object and a size of the object shown in the region.

7. A depth acquisition device, comprising
a memory; and
a processor, wherein
the processor is configured to perform:
acquiring intensities of infrared light which are stored in the memory, the intensities being measured by imaging performed by receiving the infrared light reflected on a subject by respective pixels in an imaging element, the infrared light having been emitted from a light source and an infrared light image being generated based on the intensities of the infrared light received by the respective pixels in the imaging element;
generating a depth image, by calculating a distance to the subject as a depth for each of the respective pixels in the imaging element, based on an intensity received by the pixel among the intensities of the infrared light;
acquiring a visible light image stored in the memory, the visible light image being generated by imaging: 1) substantially a same scene as a scene of the imaging of the infrared light image, 2) substantially a same viewpoint as a viewpoint of the imaging of the infrared light image, and 3) at a substantially a same timing as a timing of the imaging of the infrared light image;
correcting a depth of the depth image by inputting the depth image, the infrared light image, and the visible light image into a learning model; and
outputting the depth image with the depth corrected.

8. A depth acquisition method, comprising:
acquiring intensities of infrared light which are stored in the memory, the intensities being measured by imaging performed by receiving the infrared light reflected on a subject by respective pixels in an imaging element, the infrared light having been emitted from a light source and an infrared light image being generated based on the intensities of the infrared light received by the respective pixels in the imaging element;
generating a depth image, by calculating a distance to the subject as a depth for each of the respective pixels in the imaging element, based on an intensity received by the pixel among the intensities of the infrared light;
acquiring a visible light image stored in the memory, the visible light image being generated by imaging: 1) substantially a same scene as a scene of the imaging of the infrared light image, 2) substantially a same viewpoint as a viewpoint of the imaging of the infrared light image, and 3) at a substantially a same timing as a timing of the imaging of the infrared light image;
detecting a lower reflection region showing an object in the infrared light image in accordance with the infrared light image and the visible light image, the object having a lower reflectivity to the infrared light among the subject;
correcting a lower reflection region in the depth image corresponding to the lower reflection region in the infrared image using the visible light image; and
outputting the depth image with the lower reflection region corrected.

9. A depth acquisition method, comprising
acquiring intensities of infrared light which are stored in the memory, the intensities being measured by imaging performed by receiving the infrared light reflected on a subject by respective pixels in an imaging element, the infrared light having been emitted from a light source and an infrared light image being generated based on the intensities of the infrared light received by the respective pixels in the imaging element;
generating a depth image, by calculating a distance to the subject as a depth for each of the respective pixels in the imaging element, based on an intensity received by the pixel among the intensities of the infrared light;
acquiring a visible light image stored in the memory, the visible light image being generated by imaging: 1) substantially a same scene as a scene of the imaging of the infrared light image, 2) substantially a same viewpoint as a viewpoint of the imaging of the infrared light image, and 3) at a substantially a same timing as a timing of the imaging of the infrared light image;
correcting a depth of the depth image by inputting the depth image, the infrared light image, and the visible light image into a learning model; and
outputting the depth image with the depth corrected.

* * * * *